US008805759B1

(12) United States Patent
Cha et al.

(10) Patent No.: US 8,805,759 B1
(45) Date of Patent: Aug. 12, 2014

(54) SYSTEM AND METHOD FOR PSYCHOGRAPHIC PROFILING OF TARGETED POPULATIONS OF INDIVIDUALS

(75) Inventors: Alexandra N. Cha, Glenelg, MD (US); Hyuk Cha, Glenelg, MD (US); Lei Liu, Woodstock, MD (US)

(73) Assignee: Healthcare Interactive, Inc., Glenwood, MD (US)

( * ) Notice: Subject to any disclaimer, the term of this patent is extended or adjusted under 35 U.S.C. 154(b) by 599 days.

(21) Appl. No.: 12/538,224

(22) Filed: Aug. 10, 2009

Related U.S. Application Data

(63) Continuation-in-part of application No. 12/134,864, filed on Jun. 6, 2008, which is a continuation-in-part of application No. 11/851,146, filed on Sep. 6, 2007.

(60) Provisional application No. 60/842,489, filed on Sep. 6, 2006.

(51) Int. Cl.
*G06F 17/00* (2006.01)
*G06N 5/00* (2006.01)
*G06N 99/00* (2010.01)
*G06N 5/04* (2006.01)
*G06Q 10/10* (2012.01)

(52) U.S. Cl.
CPC *G06F 17/00* (2013.01); *G06N 5/00* (2013.01); *G06N 99/005* (2013.01); *G06N 5/04* (2013.01); *G06Q 10/10* (2013.01)
USPC .......................................................... 706/45

(58) Field of Classification Search
CPC ........ G06F 17/00; G06N 5/00; G06N 99/005; G06N 5/04; G06Q 10/10
USPC .............................................. 706/45, 46, 62
See application file for complete search history.

(56) References Cited

U.S. PATENT DOCUMENTS 5,596,994 A 1/1997 Bro
5,722,418 A 3/1998 Bro
(Continued)

OTHER PUBLICATIONS

Kolyshkina et al, "Text mining for insurance claim cost prediction", Institute of Actuaries of Australia XVth General Insurance Seminar Oct. 16-19, 2005.*
Liu et al, "Reinforcement Learning-Based Feature Learning for Object Tracking", Proceedings of the 17th International Conference on Pattern Recognition (ICPR 2004).*

(Continued)

*Primary Examiner* — Jeffrey A Gaffin
*Assistant Examiner* — Ilya Traktovenko
(74) *Attorney, Agent, or Firm* — Rosenberg, Klein & Lee

(57) ABSTRACT

A system and method are provided for psychographically profiling a target population of individuals, programmably implemented in a server apparatus. The psychographic segmentation portion includes a questionnaire processing part, a segment solution part, and a typing tool part. The questionnaire processing part acquires a plurality of responses to a predetermined set of questionnaire questions by an initial pool of target population members. The questionnaire processing part uses a combination of weighted statistical methodologies to arrive at a rule-based decision on whether the question would serve as a good wedge variable. Optionally, the rule based decision is then compared to an expert's opinion and the weights and threshold parameters of the weighted statistical combination are adjusted accordingly to more accurately match the expert's decision. The identified wedge variables are used for effectively segregating the target population into groups of homogenous individuals. The typing tool part selectively generates an abbreviated set of questions from the predetermined set of questionnaire questions for profiling an individual respondent to at least one of the segments.

20 Claims, 30 Drawing Sheets

(56) References Cited

U.S. PATENT DOCUMENTS

| | | | |
|---|---|---|---|
| 5,848,396 A * | 12/1998 | Gerace | 705/7.33 |
| 5,893,717 A | 4/1999 | Kirsch et al. | |
| 5,991,735 A * | 11/1999 | Gerace | 705/7.33 |
| 6,105,046 A | 8/2000 | Greenfield et al. | |
| 6,144,838 A | 11/2000 | Sheehan | |
| 6,470,320 B1 | 10/2002 | Hildebrand et al. | |
| 6,484,144 B2 | 11/2002 | Martin et al. | |
| 6,544,212 B2 | 4/2003 | Galley et al. | |
| 6,802,810 B2 | 10/2004 | Ciarniello et al. | |
| 6,807,492 B2 | 10/2004 | Oren et al. | |
| 6,868,342 B2 | 3/2005 | Mutter | |
| 6,873,979 B2 | 3/2005 | Fishman et al. | |
| 6,915,306 B1 | 7/2005 | Gong et al. | |
| 6,988,088 B1 | 1/2006 | Miikkulainen et al. | |
| 7,133,856 B2 | 11/2006 | Huang et al. | |
| 7,612,679 B1 | 11/2009 | Fackler et al. | |
| 7,628,614 B2 | 12/2009 | Templin | |
| 7,650,272 B2 | 1/2010 | Przytula et al. | |
| 2003/0028451 A1 | 2/2003 | Ananian | |
| 2003/0065535 A1 | 4/2003 | Karlov et al. | |
| 2004/0133081 A1 | 7/2004 | Teller et al. | |
| 2004/0152957 A1 | 8/2004 | Stivoric et al. | |
| 2004/0164983 A1 | 8/2004 | Khozai | |
| 2005/0113650 A1 | 5/2005 | Pacione et al. | |
| 2005/0123893 A1 | 6/2005 | Stout et al. | |
| 2005/0197545 A1 | 9/2005 | Hoggle | |
| 2005/0240544 A1 | 10/2005 | Kil et al. | |
| 2006/0052945 A1 | 3/2006 | Rabinowitz et al. | |
| 2006/0122465 A1 | 6/2006 | Bastien et al. | |
| 2007/0218446 A1 | 9/2007 | Smith et al. | |
| 2007/0265533 A1 | 11/2007 | Tran | |
| 2007/0276270 A1 | 11/2007 | Tran | |
| 2008/0004904 A1 | 1/2008 | Tran | |

OTHER PUBLICATIONS

Penaloza et al, "Feature Selection for Classification of Polar Regions Using a Fuzzy Expert System", Remote Sens. Environ. 58:81-100 (1996).*

Berlin et al, "Database Schema Matching Using Machine Learning with Feature Selection", CAISE 2002, LNCS 2348, pp. 452-466, 2002.*

Collins et al, "Online Selection of Discriminative Tracking Features", IEEE Transactions on Pattern Analysis and Machine Intelligence, vol. 27, No. 10, Oct. 2005.*

Jebara et al, "Feature Selection and Dualities in Maximum Entropy Discrimina ion", Uncertainty in Artificial Intelligence Proceedings 2000.*

Novovicova et al, "Divergence Based Feature Selection for Multimodal Class Densities", IEEE Transactions on Pattern Analysis and Machine Intelligence, vol. 18, No. 2, Feb. 1996.*

Pudil et al, "Feature Selection Based on the Approximation of Class Densities by Finite Mixtures of Special Type", Pattern Recognition, vol. 28, No. 9, pp. 1389-1398, 1995.*

Youn et al, "Lifestyles of Online Gamers: A Psychographic Approach", Journal of Interactive Advertising, vol. 3 No. 2 (Spring 2003), pp. 49-56.*

Ghazali et al, "Demographic and Psychographic Profile of Active and Passive Investors of KLSE: A Discriminant Analysis", Asia Pacific Management Review (2004), 9(3), p. 391-413.*

Klara et al, "I-79 Fleet Manager Perspectives on Natural Gas for Use as a Transportation Fuel", Final Report, Date: Dec. 1999.*

Kamakura et al, "Life-Style Segmentation With Tailored Interviewing", Journal of Marketing Research, vol. XXXII (Aug. 1995), 308-317.*

Horne, "A Psychographic Segmentation Analysis of Prescription Drug Users", The University of Guelph, Sep. 1997.*

\* cited by examiner

Components of a Screener/Questionnaire

| BEHAVIORS | ATTITUDES | NEEDS | MARKETING/REACH | DEMOGRAPHICS |
|---|---|---|---|---|
| • Condition<br>• Risk factors<br>• Physician diagnosis<br>• Physician visits in general and specifically<br>• Treatment approach<br>• Treatment duration<br>• Buying Process<br>• Target-related behavior<br>• Etc. | • Physician<br>• Severity<br>• Overall health<br>• Quality of life<br>• Medications<br>• Frustrations<br>• Rewards<br>• Formulary/reimbursement issues<br>• New products/adoption<br>• Loyalty/switching<br>• Personality/leadership<br>• Compliance<br>• Interest in treatment<br>• Target-related attitudes<br>• Etc. | • Efficacy<br>• Safety<br>• Side effects<br>• Tolerability<br>• Duration of action<br>• Delivery forms<br>• Dosing frequency<br>• Titration<br>• Cost<br>• Etc. | • Sources of info<br>• Personality<br>• Hobbies<br>• Marketing<br>• Etc. | • Gender, race, income, education<br>• Family composition<br>• Other health conditions<br>• Family health conditions<br>• Lifestyle<br>• Etc. |

FIG.5

Examples of Scaled & Fixed Response Question Types

| Examples: Scaled Questions | Examples: Fixed Response |
|---|---|
| • How much do you agree, if at all, that _____<br>• Do not agree   Somewhat agree   Totally agree<br>   1  2  3   4  5  6   7  8  9<br>• Respondent is asked to select one value on the scale (scales can run between any two numbers) | • Are you....?<br>  • Male<br>  • Female<br>• Respondent is asked to select one<br>• Which of the words below best describes _____<br>  • Aaa<br>  • Bbb<br>  • Ccc<br>  • Ddd<br>  • Etc.<br>• Respondent is asked to select one, two or as many as apply (depending on the question) |

FIG.6

Statistical Techniques

Linear regression (with $k$ predictors $X$) of the form: — 90
$$\hat{Y} = b_0 + b_1 X_1 + \ldots + b_k X_k + e$$

Binary Logistic regression with Assumptions: — 92
$$\pi = \frac{e^{b_0 + b_1 x_1 + \ldots + b_k x_k}}{1 + e^{b_0 + b_1 x_1 + \ldots + b_k x_k}}$$

Note: $e$ is the constant 2.71828 (base of the natural logarithm)

Nonlinear model — 94

Latent Class Regression (LCR) offering advantages over traditional approaches — 96

A two-segment solution of the general form: — 98
$$p*(\hat{Y} = b_{01} + b_{11} X_{11} + \ldots + b_{k1} X_{k1} + e_1) + (1-p)*(\hat{Y} = b_{02} + b_{12} X_{12} + \ldots + b_{k2} X_{k2} + e_2)$$

Note: In LCR, the latent variable proportions $p$ indicate the relative size of the segments and thus sum to one

FIG. 9

SYSTEM AND METHOD FOR PSYCHOGRAPHIC PROFILING OF TARGETED POPULATIONS OF INDIVIDUALS

RELATED APPLICATIONS

This application is a Continuation-In-Part of U.S. application Ser. No. 12/134,864 filed 6 Jun. 2008, now pending, which is a Continuation-In-Part of 11/851,146 filed 6 Sep. 2007, based on U.S. Provisional Application No. 60/842,489 filed on 6 Sep. 2006.

BACKGROUND OF THE INVENTION

The present invention is generally directed to automated measures for optimally profiling a particularly targeted population of individuals so as to enable highly reliable predictive modeling and highly tailored communications based thereon. More specifically, the subject system for psychographic profiling employs a statistical engine for profiling individuals based on a predetermined set of personal data acquired for the targeted population. The acquired data may include qualitative and quantitative information relating comprehensively to subjective indicia for attitudinal, behavioral, and preferential attributes of the individuals to supplement other more objective information that may be available (such as health/medical, pharmaceutical, and hospital claims history data).

The need for reliable predictive modeling to guide proper policy and planning is prevalent throughout virtually all identifiable sectors of modern day society. They include both public and private sectors, and run across the full spectrum of industries, markets, and business areas. While the particular demographics of the populations targeted will undoubtedly vary across enterprises—as will the nature of the parameters predicted, and the purposes of the endeavor—the need to capture and reduce the necessary personal information to meaningfully equip the predictive modeling required is a prevailing need, regardless of enterprise.

The health industry is but one example of the numerous applications for the present invention. The need for optimal patient profiling, and highly reliable predictive modeling of future behavior based thereon, is of particular importance in this industry historically marked by wide scale waste, poor management, and lack of cost control. Health care providers, insurers, and regulators alike have long struggled to predict responsive behaviors of patient populations with accuracy in the hopes of efficiently allocating vital resources, while actually improving the quality of care and resulting outcomes. Despite myriad of often very complex efforts, their attempts have largely failed in this regard.

Consequently, there remains a shared need in health care applications as well as others for a comprehensive tool which effectively captures and optimally reduces both subjective and objective information personal to individuals in a given population for use in predictive modeling to assess future outcomes. There remains a need for such tool, moreover, which captures and optimally factors the psychographic persuasion and/or tendencies of individuals within the given population. There remains a particular need for such tool in health care applications to conveniently and effectively enable health care providers, insurers, and regulators to improve quality of care and resulting outcomes by proactively identifying behaviors and medical conditions that adversely affect the patient, employer, health plan, or the like.

SUMMARY OF THE INVENTION

It is an object of the present invention to provide a system and method which captures and optimally reduces subjective information personal to individuals in a given population, for use in predictive modeling.

It is another object of the present invention to provide a system and method which provides psychographic profiles for individuals in the given population to enable reliable prediction of their behavioral tendencies.

It is yet another object of the present invention to provide a question selection tool for consistently and reliably choosing questions that are able to segment a given population into homogenous groups.

It is another object of the present invention to provide a system and method that learns to arrive at decisions that an expert would make by selectively adjusting parameters until the system decisions are very similar to those decisions made by the expert.

It is still another object of the present invention to provide a psychographic profiling tool for reliably classifying individuals with one of a plurality of segments defined for the given population.

These and other objects are attained in a system and method formed in accordance with the present invention for psychographically profiling a target population of individuals. In an embodiment of the system and method, a psychographic segmentation portion is programmably implemented in a server apparatus. The psychographic segmentation portion includes a questionnaire processing part, a segment solution part, and a typing tool part. The questionnaire processing part is operable to acquire a plurality of responses to a predetermined set of questionnaire questions by an initial pool of target population members. It statistically analyzes the acquired responses to selectively identify a plurality of questionnaire questions as wedge variables through a weighted statistical analysis, which are ranked according to their capacity for segregating the target population into a predetermined distribution of groups. The segment solution part is operable to generate a plurality of candidate segments to correspond respectively to a set of highly ranked wedge variables. The segment solution part selectively sets an optimized set of segments from the candidate segments responsive to a predefined set of selection criteria, whereby each segment is defined by at least one highly ranked wedge variable. The typing tool part is operable to selectively generate an abbreviated set of questions from the predetermined set of questionnaire questions. The abbreviated set of questions correspond to the highly ranked wedge variables and serve to map a respondent of the abbreviated set of questionnaire questions to at least one of the segments.

In an application of the system and method for developing an instrument for psychographically profiling individuals within a target population, the system comprises a model build portion operable to generate at least one psychographic profiling model having a plurality of profiling segments. The model build portion includes a data definition part operable to control generation of a survey containing an initial set of questions pertaining to the target population, and to control acquisition of responses to the initial question set from an initial pool of target population members. The model build portion also includes a variable or question selection part operable to determine based upon evaluation of the acquired responses, through statistical analysis from a weighted combination of criteria, relative capacities of the questions to consistently segregate the target population relative to predefined group distribution criteria. The variable or question selection part identifies a plurality of meaningful wedge variables responsive to the determination to include at least a subset of the questions. The model build portion further includes a segment definition part operable to selectively define an optimal set of profiling segments correlated to respective ones of the wedge variables for selective combination in accordance with response data for the wedge variables. Various combinations of the profiling segments collectively define unique psychographic profiles for individuals within the target population.

A typing tool generation portion is also provided in the system. The typing tool generation portion is operable to identify a set of determinant variables selected from the wedge variables correlated to the optimal set of profiling segments. The determinant variables define a typing tool for substantially acquiring the response data from an individual.

BRIEF DESCRIPTION OF THE DRAWINGS

FIG. 5 is a table illustrating specific examples of informational categories covered by questionnaires questions in accordance with one exemplary embodiment of the present invention;

FIG. 6 is an illustrative example of various question types employed in accordance with an exemplary embodiment of the present invention;

FIG. 9 is a chart illustrating examples of statistical techniques employed in accordance with one exemplary embodiment of the present invention;

DETAILED DESCRIPTION OF THE PREFERRED EMBODIMENTS

Figure 1:
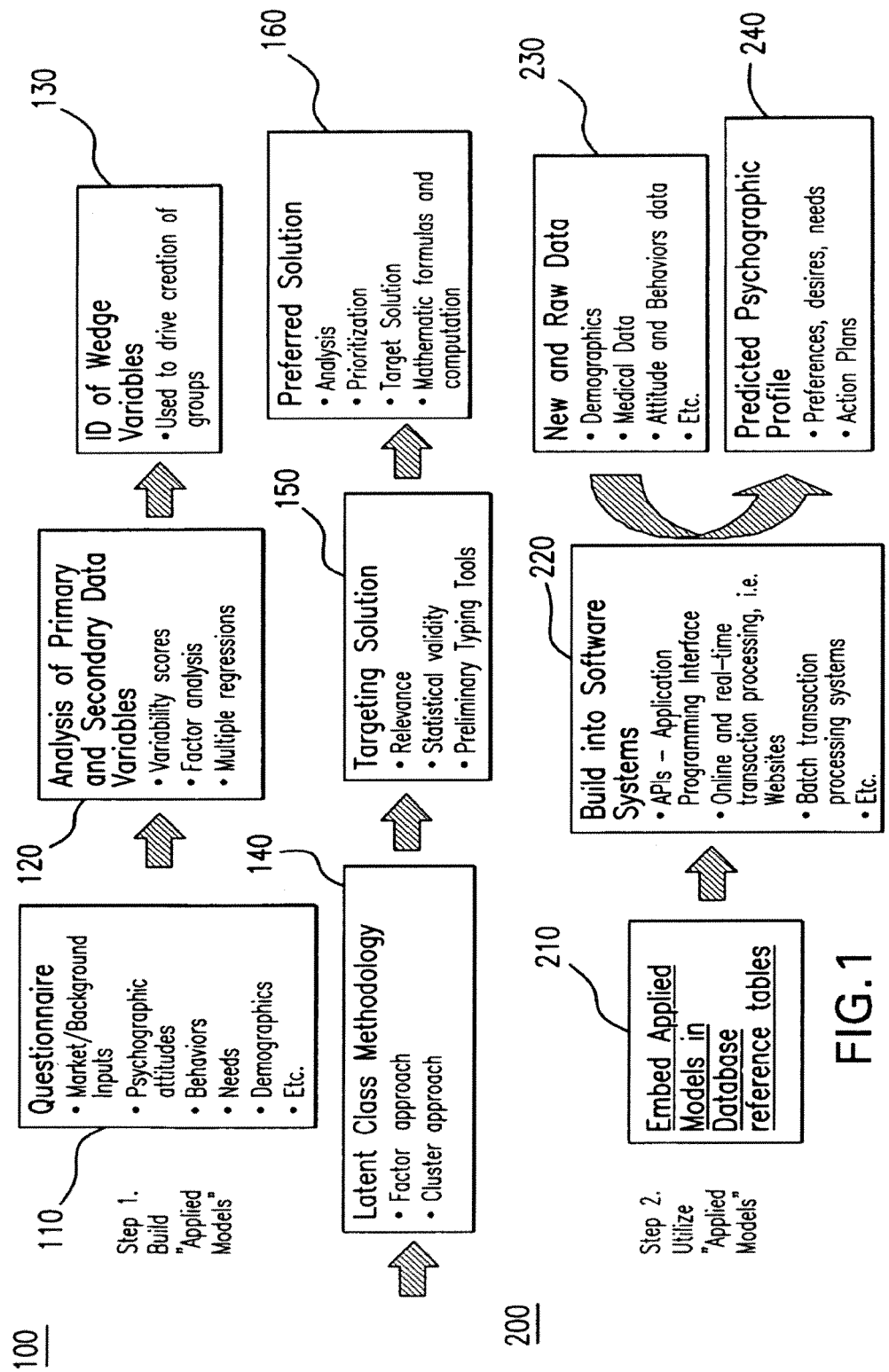
FIG. 1 is a schematic block diagram illustrating the progression of processes in accordance with one exemplary embodiment of the present invention.

Turning now to FIG. 1, there is schematically illustrated a flow of processes carried out in accordance with one exemplary embodiment of the present invention. The system generally includes a psychographic segmentation portion 100 wherein a comprehensive set of personal data for individuals belonging to a targeted patient population is acquired and processed to generate optimized segments by which to psychographically profile them. In accordance with the present invention, statistically meaningful psychographic information is ascertained and used to drive the segmentation process. This information preferably includes predetermined indicia for individuals' attitudes and wants, as well as subjectively perceived needs and the like.

The system preferably includes a utilization, or profiling, portion 200 wherein the optimized segments are programmably utilized to determine the relevant psychographic profiles of particular individuals. From this, the user may reliably assess future outcomes relating to those particular individuals. Unlike the segmentation portion 100, the actual configuration of this portion will vary considerably with the intended application, so as to suit the specific context of use.

In the embodiment illustrated in FIG. 1, various attitudinal, behavioral, and medical information data is acquired at block 110 for individuals in a targeted population of past or would be patients. This may be carried out, for instance, by directly obtaining questionnaire responses from a suitably sized pool of respondents, or indirectly by gleaning such responses from other available information. Preferably, the questionnaire (which may be administered to the population by any suitable means), captures subjective patient responses to questions relating to such things as personality, leadership, risk tolerance, patient-physician relationship, health habits, and readiness to change. At block 120, various secondary sources of personal information like medical and insurance records may be consulted to supplementally acquire other more objective information relating to demographics, medical claims history, pharmacy claims history, prior health risk assessments, lab data, or the like.

In the particular healthcare context illustrated, then, the disclosed system employs a server operably configured with program instructions to implement a plurality of highly determinative segmentation models derived by use of latent class modeling and/or other suitable statistical modeling techniques to predict and assess the pertinent psychographic and behavioral profile of an individual, based on certain questionnaire responses of that individual. This informs the predictive modeling of insurers or other users to reliably predict healthcare-related costs and risk to be expected for the individual. This also assists population management programs and medical providers, as well as the patients themselves, to better manage patient health and mitigate risk. As a result, better treatment plans and protocols may be created based not only on patients' objective attributes and health status, but also on subjective tendencies as indicated by their psychographic and behavioral characteristics.

The system establishes and maintains a database which captures the complete psychographic profile of a particular patient, containing all pre-analyzed and post-analyzed data specific to that particular patient. The patient's data set preferably includes, but is not limited to, all attitudinal and behavioral responses, medical claims, pharmacy claims, lab data, and health risk assessments.

Figure 2:
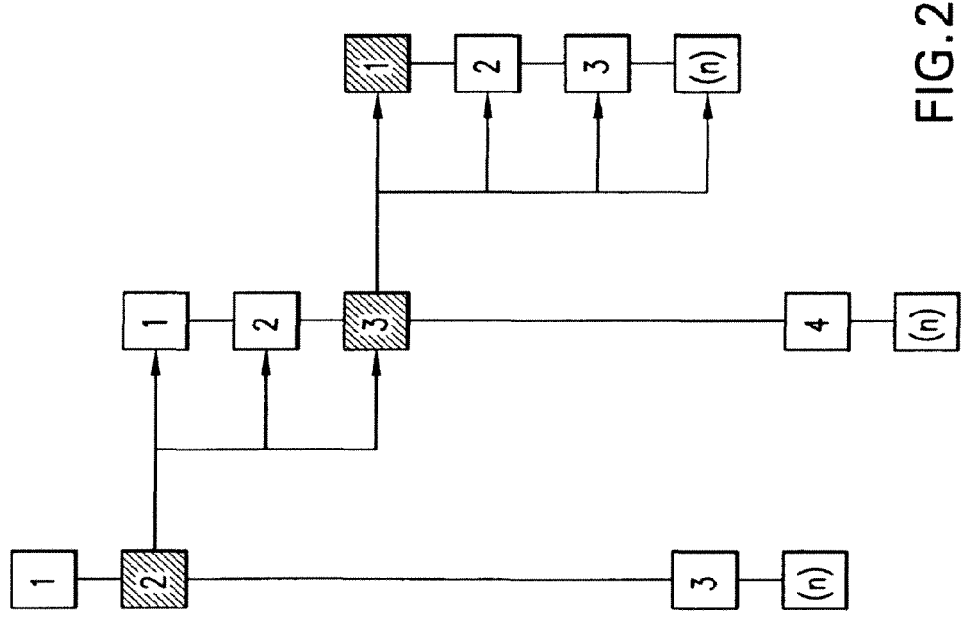
FIG. 2 is a schematic diagram illustrating an exemplary arrangement of nodes within a portion of a hierarchical tree defined in accordance with the present invention.
Figure 3:
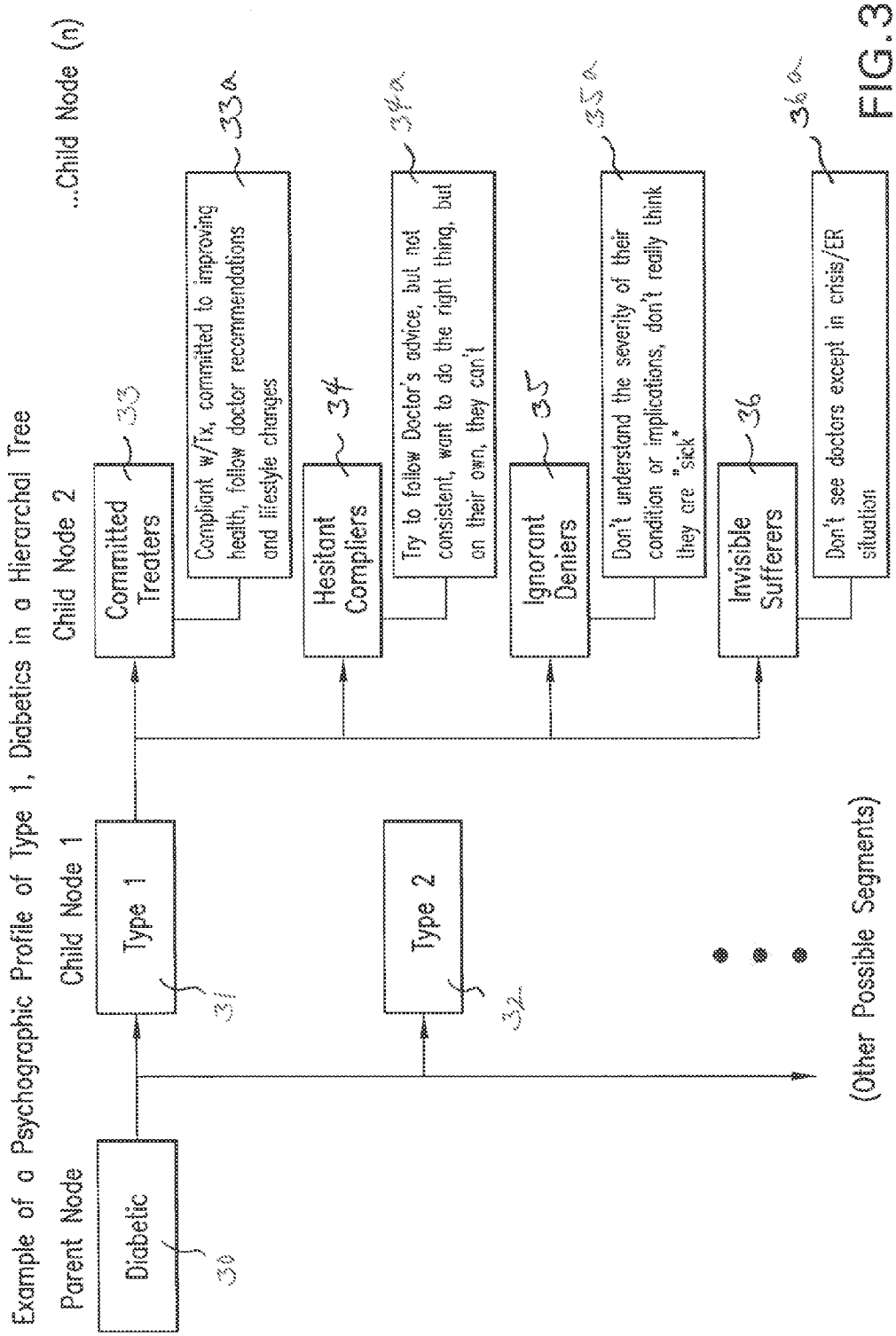
FIG. 3 is a schematic diagram illustrating a specific example of a hierarchal tree portion for a certain class of patients.

Preferably, psychographic profiles are characterized through a hierarchal tree of nodes at successive levels (parent and child nodes), as illustrated in the example of FIG. 2. Statistical modeling techniques are automatically executed to define one or more distinct characterizing segments within each node, which enable individuals to be accurately profiled therethrough. The hierarchal tree database structure captures parent to child relationships between nodes, with the levels of characterization broken more finely into smaller subsections at each successive child node. The nodes and segments are specifically defined by the attitudinal and behavioral characteristics found through the modeling and analysis of questionnaire responses from a sufficient pool of respondents (in view of the demographics and all the other health related data) to be the most consistent in segregating groups of individuals into like subgroups (FIG. 3).

In connection with FIG. 2, if the "applied model" ultimately resulting from the process, which includes mathematical formulas derived by statistical analyses, identifies a patient to be characterized by the highlighted blocks in its hierarchal tree as illustrated, the patient's characteristics would be identified as "2-3-1," where the numeric values represent different segments or classifications. The Parent Node could be defined as "disease states," for example, with the Parent Node block "2" representing all populations of diabetics. The Child Node "1" (or . . . n) in this example could be defined as types of diabetics, either by medical classification or by other classifications such as behavioral or attitudinal indicators identified by the applied models created from statistical modeling techniques. Each subsequent Child Node level could be subdivided into additional Child Nodes (n) identified as further subsets of psychographic classifications defined by the given data.

Figure 4:
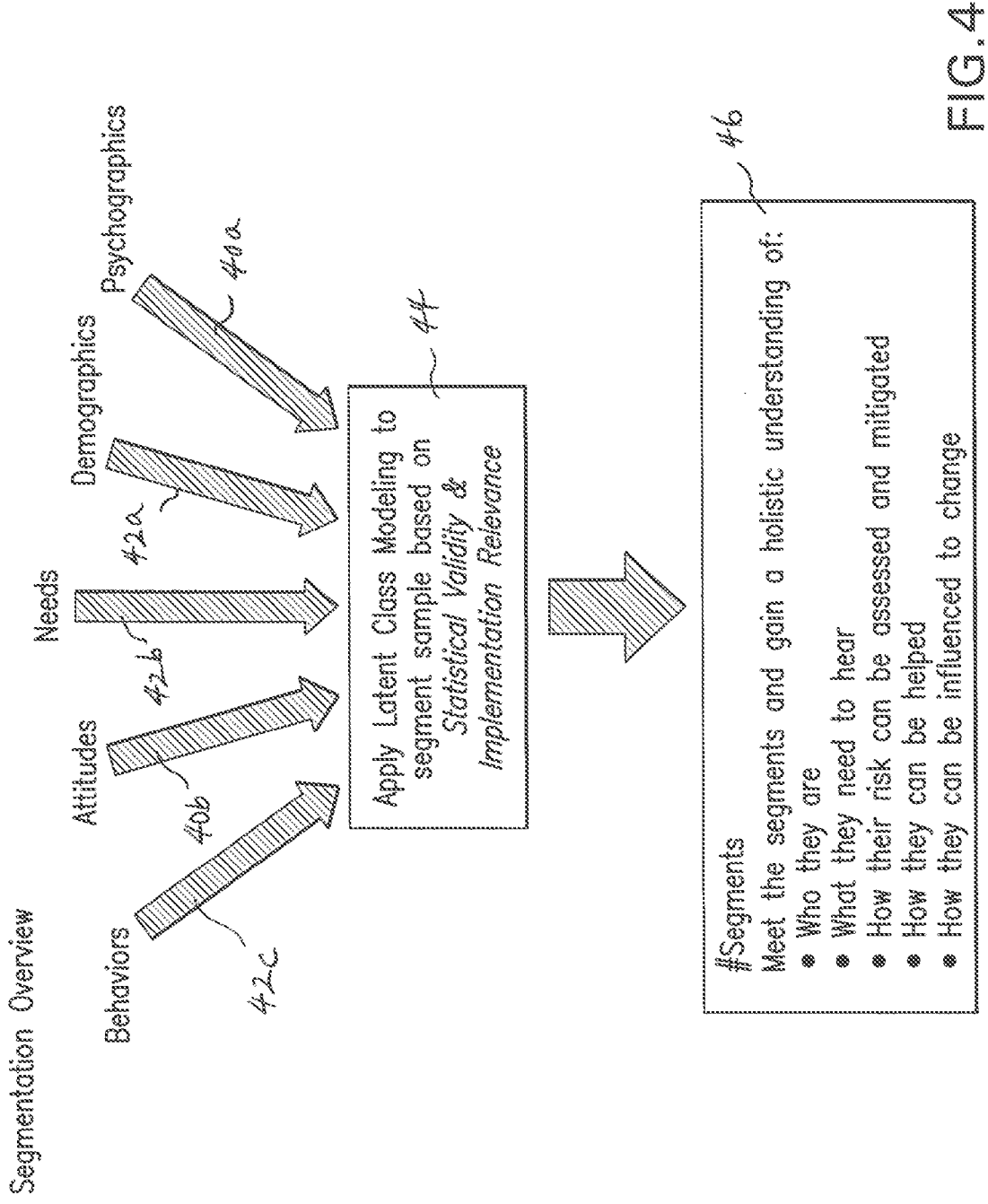
FIG. 4 is a schematic diagram illustrating a conceptual overview of a psychographic segmentation approach taken in accordance with one exemplary embodiment of the present invention.

As schematically illustrated in FIG. 4, various types of personal data relating to members of the target population are acquired and statistically analyzed (as indicated at block 44) to obtain a set of profiling segments (as indicated at block 46). Preferably, the types of data include subjective psychographic data 40*a* such as personal attitudes 40*b* and perceptions indicated by responses to certain carefully configured questionnaire questions, as well as the more objective data such as demographics 42*a*, medical needs 42*b*, and documented behavioral histories 42*c* which may be available through secondary sources other than the questionnaire. The acquired information is processed to ultimately identify an optimized set of profiling segments inter-related in a hierarchically organized manner to provide a simple yet reliable profile of an individual based upon his or her responses to the questionnaire. In accordance with the present invention, the obtained segments inform the user to gain a holistic understanding of, among other things, who really the respondent is, what he/she needs to hear, how the respondent's risks may be assessed and mitigated, how the respondent may be otherwise helped, and how the respondent may be effectively influenced to make corrective changes in habits, lifestyle, and the like.

Responses to the given questionnaires are captured by any suitable means—via online, paper, telephonic and/or in person—and transferred into a database. The questionnaire questions are generated in predetermined manner to span a range of attitudinal and behavioral categories. One example of categories for the illustrated embodiment is shown in FIG. 5 and includes such categories as behaviors, attitudes, needs, marketing reach, and demographics. Obviously, these categories may overlap with information (such as demographics and behavior history) which may be available already through personal records and other such secondary sources of data. Also, particular questionnaire questions may fall within more than one category, so long as comprehensive coverage of all categories is collectively realized by the full set of questionnaire questions.

Generally, two types of questions are used to separate and segment profiles: scaled and fixed response question types. Examples of such question types for the illustrated embodiment are shown in FIG. 6. Scaled questions are those which invoke in response a relative measure referenced to a graduated continuum, such as a numeric scale of "1" to "9" representing an increasing range between "do not agree" and "totally agree." Fixed questions are those that invoke discrete responsive information, such as identification of the respondent's gender and selection of one or more applicable items from a delineated set.

More objective information from other available sources of health-related records (medical, pharmaceutical, insurance records, personal history, demographic data, . . . ) are preferably combined with the questionnaire responses to fully identify and segment the population. In the example of FIG. 3, for instance, the population is initially segmented according to patients suffering from certain types of diabetes.

Wedge questions, or wedge variables, may, in certain embodiments be pre-selected (hypothesized), tested for significance, and confirmed or changed through the statistical analysis carried out at blocks 120, 130. Wedge variables in other embodiments may simply be identified by the statistical analysis. These wedge variables are defined as those that best segregate respondents into homogenous groups and serve to identify their most distinctive differences. The different groups should be heterogeneous or orthogonal with relation to each other. One group should be as distinct from another group as possible. When identified, the wedge variables are preferably flagged as such in the database.

Figure 7:
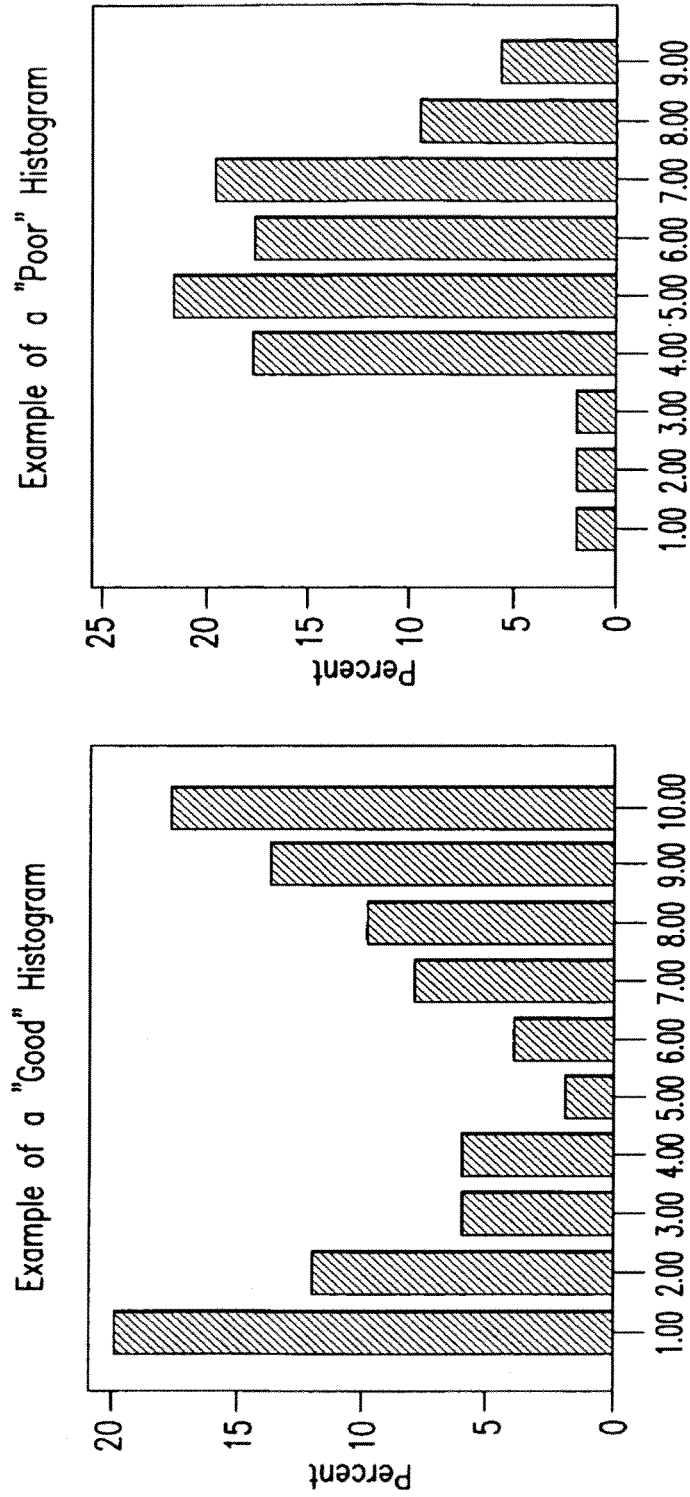
FIG. 7 is a comparative diagram schematically illustrating examples of good and poor histogram characteristics referenced in accordance with one exemplary embodiment of the present invention.

Wedge variables are identified at block 130 upon separately analyzing at block 120 the pool of responses acquired for each questionnaire question from their distribution using histograms, for example, as illustrated in FIG. 7. The system operates to selectively identify, either automatically or with manual (expert) input, wedge variables by pre-defining the required distribution characteristics of the responses. Optimal wedge variables yield histograms that are relatively flat or multi-peaked (FIG. 7a), whereas poor candidates for wedge variables yield histograms that are single peaked or shaped such that the majority of responses are clustered tightly around one response or one part of the scale (FIG. 7b).

In the example illustrated in FIG. 7, a wedge variable would be chosen by seeking histograms pertaining to questions that divide respondents into more than one group. Multi-peaked or flat histograms would generally be preferable over single peak distributions of data.

In practice, it is important to ensure that no one topical area is over-represented by the questionnaire. Each question preferably contains meta-data relating to a thematic category, content area, or what topic the question pertains to. Thereby, questions or variables can be evaluated for potential wedge variable status from a mix of different content areas or topics. Otherwise, if wedge variables are selected having the same content area or topic, that content area or topic will be biased or over-represented. Some exemplary content areas could be demographics, health, psychographics, behavioral, need-based, media-based, product-based, service-based, or secondary-data-based. If all questions were selected from the content area of demographics, then the model becomes driven by similarities and differences in demographic data, and less influenced by other types of data. This is not preferable because the model would be forced to be uni-dimensional, rather than multi-dimensional. In certain embodiments, the area under each histogram curve is preferably normalized to unity, so that disparate weighting of responses is more readily apparent.

Optionally, a selectively set distribution threshold is employed in identifying wedge variables. If a peak for a response histogram exceeds the threshold, the corresponding question is rejected as a possible wedge variable (FIG. 8b). Alternately, if the peak of the response histogram remains within the threshold, the corresponding question may be selected as a wedge variable (FIG. 8a). By selectively adjusting this wedge variable threshold accordingly, the system may iteratively and automatically identify the required (or desired) number of wedge variables to be utilized in the segmentation process. Suitable factor analysis and multiple regression techniques may be employed at blocks 120, 130 to hierarchically select wedge variables representative of the most notable topical areas. Wedge variables are not necessarily limited to questionnaire questions and may, depending on the requirements of the intended application, include variables taken from other additional data sets such as demographic and health data.

Figure 8:
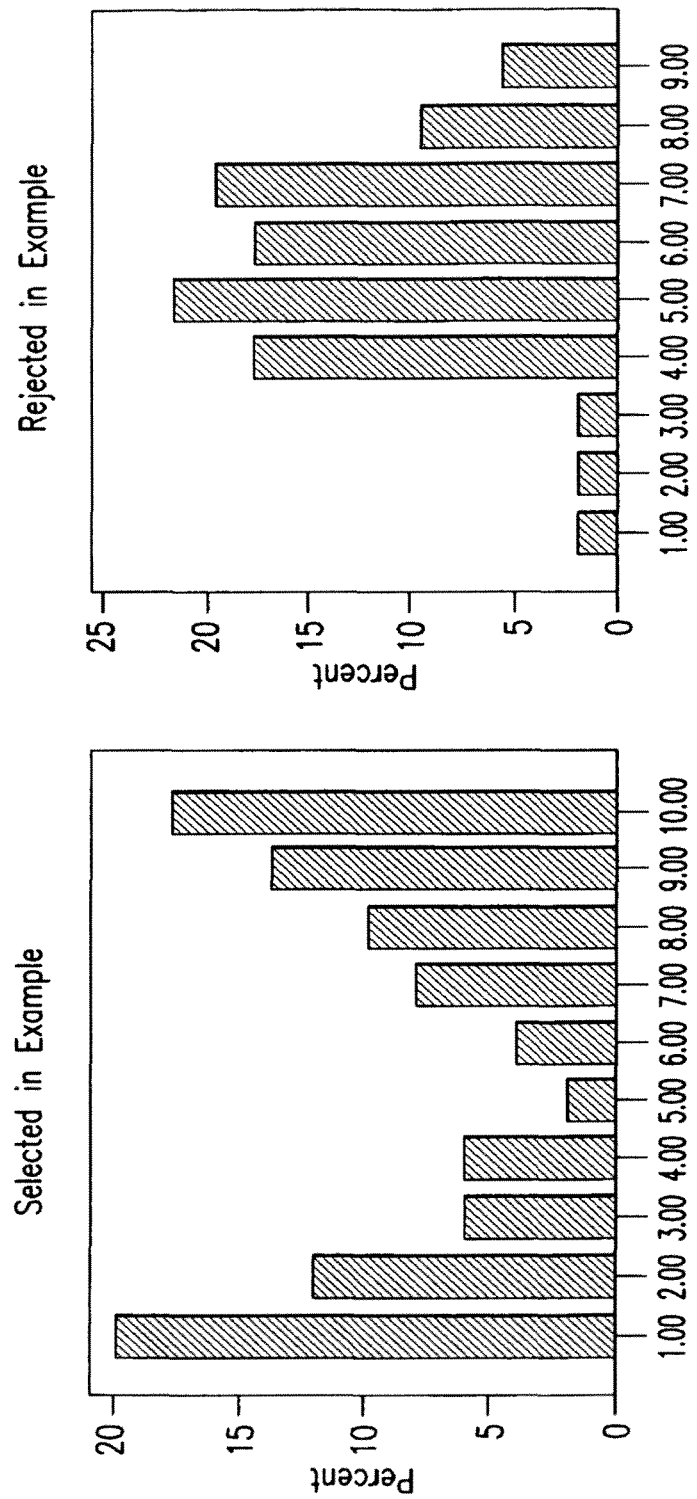
FIG. 8 is a comparative diagram schematically illustrating examples of selected and rejected histogram profiles relative to a selective threshold in accordance with one exemplary embodiment of the present invention.

In the specific example illustrated in FIG. 8, a "ceiling method" for auto-selection of wedge variables may accordingly be employed as follows: a ceiling is placed on the vertical "percent" axis. Histograms for variables that remain below the preset ceiling level are then selected, while histograms for variables which surpass the ceiling level in height are deemed to be poor histograms. The ceiling level may be adjusted iteratively thereafter until a desired number of wedge variables are selected in this manner. If, for example, the ceiling level were set at 20% as in the illustrated example, the variable whose data is plotted on the left would be selected in the illustrated application, while the variable whose data is plotted on the right would be rejected.

More preferably, response histograms of parameter frequencies or characteristic data are evaluated in block 130 using a weighted combination of statistical analysis methods or functions to automatically determine and quantify their desirability in segmenting groups to output resultant final indicia. Once responses to a question have been collected and aggregated, they are represented in a histogram format or any similar format which calculates, describes, or tabulates frequency distribution. Each histogram may be evaluated and quantified based on a combination score representing a weighted summation of different statistical criteria illustratively including: standardized entropy, standard deviation, maximum odds ratio (individually or considering neighboring answers), index of qualitative variation, or any other suitable criteria employable to determine the spread, lumping, peaking, or distribution of histograms representing wedge candidate questions. A plurality of criteria $d_i$ are chosen and combined to form a formal decision rule D based at least in part on the relative frequency of the ith answer.

An exemplary criterion, $d_1$, for measuring spread of answers may be standardized entropy. Entropy measures uncertainty of which slots answers will fall into. In this case, the entropy formula has been normalized or standardized by dividing by the maximum value log(m) such that the maximum value of H will always be 1.

$$H = \frac{\sum_{i=1}^{m} p_i \log(p_i)}{\log(m)}$$

where m=maximum possible answers (generally less than 10) for a given question and $p_i$ is the relative frequency of the ith answer. H, representing standardized entropy, will always be between 0 and 1 inclusive. When H=0, this will represent the situation that all answers are bunched together with no significant distribution or division. H=1 will represent the situation where the evaluated histogram is well divided and may be a good candidate for wedge variable status.

Another similar exemplary criterion, $d_2$, is standard deviation:

$$sd = \sqrt{\sum_{i=1}^{m} (x_i - \bar{x})^2 p_i} \text{ , where } x_i = \frac{i-1}{m-1} \text{ and } \bar{x} = \sum_{i=1}^{m} x_i p_i$$

Standard deviation measures variability or dispersion of the answers in a given histogram. A low sd will indicate that the answers are clumped around a common answer which indicates a poor wedge variable as the answers do not allow for the population to be split-up or divided well into homogenous groups. Contrarily, a high sd will indicate a good spread and will indicate that the question represented by the histogram may make a good wedge variable.

Another criterion is the maximum odds ratio which has two sub-parts. A first sub-part, $d_3$, evaluates each possible answer to a question in the histogram individually looking for peaks at individual answers.

$$odds1.\max = \max_{1 \leq i \leq m} \frac{p_i}{1 - p_i}(m-1)$$

The second sub-part, $d_4$, of the maximum odds ratio evaluates each potential answer in groups, in relation to neighboring answers looking for lumped or grouped neighboring peaks. Generally there will not be more than 10 bins or possible answers to a question. Therefore the second sub-part of the maximum odds ratio evaluates only 2 answers together, but if ever there were more than 10 possible answers, the second sub-part may be modified to consider a bigger group than two. In the maximum odds ratio, a larger value represents more concentration and therefore a less desirable candidate for wedge variable status.

$$odds2.\max = \max_{1\leq i\leq m-1} \frac{p_i + p_{i+1}}{1-(p_i+p_{i+1})} \frac{m-2}{2}$$

Therefore, the smaller odds1.max and odds2.max are more informative and will be more useful in segregating groups. Questions with smaller odds1.max and odds2.max will be more likely to be a good wedge variable candidate.

Another criterion is the index of qualitative variation. The index of qualitative variation has two sub-parts; the first sub-part, $d_5$, quantifies the probability of answers not being put into the same X coordinate, or stated another way, the probability of answers not being the same.

$$IQV = \left\{1 - \sum_{i=1}^{m} p_i^2\right\} \frac{m}{m-1}$$

The index of qualitative variation has a second sub-part, $d_6$, that considers and quantifies the probability of not putting an answer into neighboring boxes.

$$IQV2 = \left\{1 - \sum_{i=1}^{m} p_i^2 - \sum_{i=1}^{m-1} p_i p_{i+1}\right\} \frac{1}{U(m)}$$

where $U(m)$ is the upper bound of $$1 - \sum_{i=1}^{m} p_i^2 - \sum_{i=1}^{m-1} p_i p_{i+1}.$$

By weighting and combining together a plurality of the above illustrative, non-exclusive criteria, a decision rule which is more informative than any of the individual criterion is able to be formulated. Preferably, the combination rule D would comprise:

$$D = \text{sign}(\alpha_0 + \alpha_1 d_1 + \ldots + \alpha_6 d_6)$$

where the "sign" operator returns either a positive or a negative value. The form $\alpha_i d_i$ allows a weight to be assigned to each individual criterion $d_i$ in arriving at the final decision D. The combination threshold is represented by $-\alpha_0$ and $d_i \in \{0, 1\}$ is the ith decision based on the ith criterion. $D \in \{-1,1\}$ is the combined decision.

Optionally, a step of selecting optimum threshold and weights for a particular application, includes minimizing $\Sigma_k(D_k - D_k^0)^2$ where $D_k^0$ is an expert decision tailored to a specific application and $D_k$ is the decision by rule for the $k^{th}$ variable.

For computational convenience, the definition of D may be modified to be: $D = S(\alpha_0 + \alpha_1 d_1 + \ldots + \alpha_6 d_6)$ where $S(\ )$ is a sigmoid function whose value is between −1 and 1. The negative of $\alpha_0$ ($-\alpha_0$) is the combination threshold and each of $\alpha_i$ ($i=1, 2, 3 \ldots 6$) is a weight factor applied to a corresponding decision $d_i$. A gradient method or a half-life step function may be used to arrive at $\alpha_i$. $S(\ )$ is defined as:

$$S(x) = \frac{1 - \exp(-\lambda x)}{1 + \exp(-\lambda x)},$$

where $\lambda$ is a prefixed constant chosen to optimize the equation to more closely match expected results. The derivative would then be:

$$S'(x) = \frac{\lambda}{2}[1 - S(x)^2].$$

Preferably $\lambda$ will be chosen to equal 4.

A Simplified Multilayer Perceptron (MLP), or a feedforward artificial neural network model, can be used to adjust thresholds of individual criterion together with thresholds and weights of the final rule. For a given variable or question, one formulation may be:

$$d_i = S(\beta_{i0} + \beta_{i1} c_i), i = 1, 2, \ldots, m;$$

$$D = S(\alpha_0 + \alpha_1 d_1 + \ldots + \alpha_6 d_6)$$

where $\beta_{i0}$ is a threshold, $\beta_{i1}$ is a weight factor, and $C_i$ is the score of the $i^{th}$ criterion. The parameters $\beta$ and $\alpha$ are estimated by minimizing $\Sigma_k(D_k - D_k^0)^2$ where $D_k^0$ is an expert decision and $D_k$ is the decision by rule for the $k^{th}$ variable or question.

In an illustrative embodiment where six criteria are considered there will be six input: $c_1, c_2, \ldots c_6$. These six inputs will result in six hidden layer outputs: $d_1, d_2, \ldots d_6$. The six hidden layer outputs are then factored together to arrive at one final output: D. In the adjustment stage, the final output D will be compared with a heuristic decision A by an expert, where decision A, for convenience, refers to decision $D^0$ in the above discussion. The difference between the decision A by the expert and the rule based decision D will be minimized by selectively adjusting the parameters $\beta$ and $\alpha$.

For example, if only one sample were available, then the equation $E = \frac{1}{2}(A-D)^2$ should be minimized by adjusting the parameters $\beta$ and $\alpha$. A gradient method can be used to achieve this. Partial derivates of $\partial E/\partial \beta$ and $\partial E/\partial \alpha$ are computed as such:

$$\frac{\partial E}{\partial w_0} = (D - A)\frac{\lambda}{2}(1 - D^2);$$

$$\frac{\partial E}{\partial w_i} = (D - A)\frac{\lambda}{2}(1 - D^2)d_i; i = 1, 2, \ldots 6.$$

and $$\frac{\partial E}{\partial \beta_{i0}} = \frac{\partial E}{\partial d_i} \frac{\partial d_i}{\partial \beta_{i0}} = (D - A)\frac{\lambda}{2}(1 - D^2)\alpha_i \frac{\lambda}{2}(1 - d_i^2);$$

$$\frac{\partial E}{\partial \beta_{i1}} = \frac{\partial E}{\partial d_i} \frac{\partial d_i}{\partial \beta_{i1}} = (D - A)\frac{\lambda}{2}(1 - D^2)\alpha_i \frac{\lambda}{2}(1 - d_i^2)c_i.$$

A sample size of n, or n sets of inputs ($c_1, c_2, \ldots c_n$), and objective expert input A are denoted respectively as ($c_{k1}, c_{k2}, \ldots c_{kn}$) and $A_k$. Similarly, the corresponding hidden layer criterion output and final layer decision output are denoted as ($d_{k1}, d_{k2}, \ldots d_{k6}$) and $D_k$ respectively.

E will be defined as $$E = \frac{1}{2}\sum_{k=1}^{n}(A_k - D_k)^2.$$

$$\frac{\partial E}{\partial \alpha_0} = \sum_{k=1}^{n}(D_k - A_k)\frac{\lambda}{2}(1 - D_k^2);$$

$$\frac{\partial E}{\partial \alpha_i} = \sum_{k=1}^{n}(D_k - A_k)\frac{\lambda}{2}(1 - D_k^2)d_{ki}, i = 1, 2, \ldots 6.$$

$$\frac{\partial E}{\partial \beta_{i0}} = \sum_{k=1}^{n}\frac{\partial E}{\partial d_{ki}}\frac{\partial d_{ki}}{\partial \beta_{i0}} = \sum_{k=1}^{n}(D_k - A_k)\frac{\lambda}{2}(1 - D_k^2)\alpha_i\frac{\lambda}{2}(1 - d_{ki}^2)$$

$$\frac{\partial E}{\partial \beta_{i1}} = \sum \frac{\partial E}{\partial d_{ki}}\frac{\partial d_{ki}}{\partial \beta_{i1}} = \sum (D_k - A_k)\frac{\lambda}{2}(1 - D_k^2)\alpha_i\frac{\lambda}{2}(1 - d_{ki}^2)c_{ki}.$$

Therefore the iterative step in the gradient method is:

$$\alpha_0(t+1) = \alpha_0(t) - \eta\frac{\partial E}{\partial \alpha_0}\bigg|_t$$

$$\alpha_i(t+1) = \alpha_i(t) - \eta\frac{\partial E}{\partial \alpha_i}\bigg|_t$$

$$\beta_{i0}(t+1) = \beta_{i0}(t) - \eta\frac{\partial E}{\partial \beta_{i0}}\bigg|_t$$

$$\beta_{i1}(t+1) = \beta_{i1}(t) - \eta\frac{\partial E}{\partial \beta_{i1}}\bigg|_t$$

where $\eta$ is a positive constant; $\alpha_0(t)$=is the value of $\alpha_0$ at the $t^{th}$ step; and $$\frac{\partial E}{\partial \alpha_0}\bigg|_t$$

is the value of $$\frac{\partial E}{\partial \alpha_0}$$

at the $t^{th}$ step as well. The meanings of the other quantities are similar to those used supra and will not be discussed herein.

Figure 21:
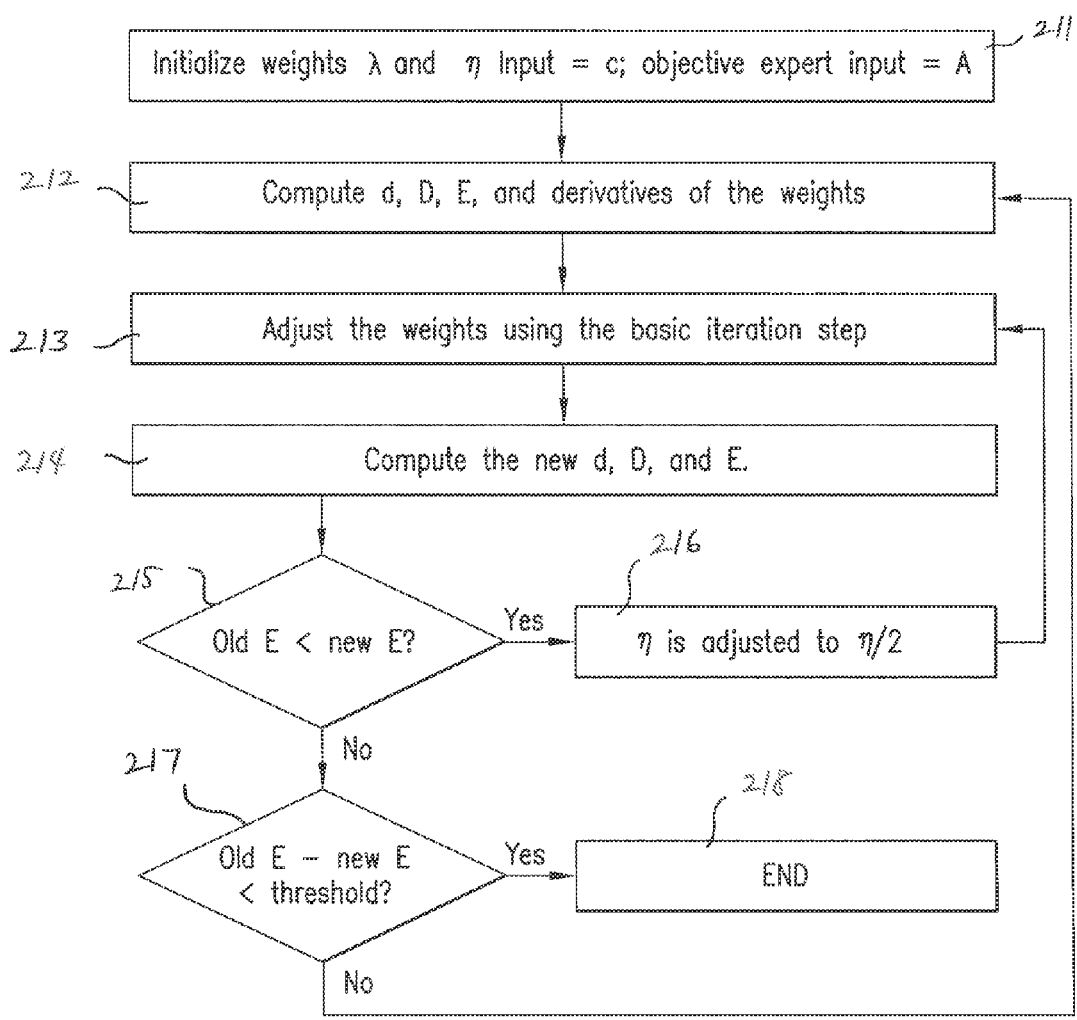
FIG. 21 is a flow diagram schematically illustrating an exemplary flow of an implementation of a Multilayer Perceptron (MLP) method in accordance with one exemplary embodiment of the present invention.

An implementation, as seen in FIG. 21, of the MLP method consistent with an aspect of the invention of the subject Patent Application for choosing an optimal set of variables under supervision of an expert includes (as indicated at blocks 211-218):

(Note: the value of $\eta$ may be adjusted herein, and the values of Es should decrease).

(a) Initialize weights, $\lambda$ and $\eta$. Input=c; objective expert input=A.

(b) Compute d, D, E, and derivatives of the weights.

(c) Adjust the weights using the basic iteration step described supra.

(d) Compute the new d, D, and E.

(e) If the old E is less than the new E, $\eta$ is adjusted to $\eta/2$ and return to step (c). Else, proceed to step (f).

(f) If the difference between the old E and the new E is less than a certain threshold, end the algorithm. Else, go to step (b).

Once calculations have been completed, and meta-data has been considered to avoid biasing or over-weighting a particular topic of question, questions having a D value greater than 0 may be selected to be wedge variables, while questions having a D value less than 0 generally will make poor wedge variables and will not be selected.

Next, in building the psychographic profiling model, suitable Latent Class, Cluster and/or Factor statistical modeling techniques known in the art are applied at block 140 to the identified wedge variable responses to create segmentation solutions. FIG. 9 illustrates examples of such statistical modeling techniques which may be applied in this manner. They include linear regression 90, binary logistic regression 92, latent class regression, and the like. The details of such techniques are well known to those skilled in the art, and will not be further described herein.

Nonetheless, a few points bear mention in connection with the statistical techniques indicated in FIG. 9. Traditional linear regression makes restrictive assumptions such as:

Dependent variable (Y) shown at block 90 in FIG. 9 is continuous in nature (prediction errors (e) are normally distributed); and, Population is homogenous—i.e., one model holding for all cases.

The parameters (b) in linear regression 92 are estimated via ordinary least square (OLS) techniques wherein:

The squared deviation between actual and predicted values of Y are minimized; and, Certain parameters indicate change in Y associated with unit change in X.

The binary logistic regression technique 92 illustrated in FIG. 9 assumes that the dependent variable is dichotomous (e.g., Yes, No), and that the probability ($\pi$) of having one or the other is bounded between 0 and 1. Error is assumed to be distributed as binomial, not normal. The population is again assumed to be homogenous—i.e. one model holding for all cases.

Where the model is nonlinear 94, parameters (b) are estimated via iterative numerical methods. This results in maximum likelihood estimates.

The advantages provided by latent class regression (LCR) 96 over traditional approaches include the following:

No assumption is made that any one model is best for all cases;

Unique regression models are developed simultaneously for each segment; and,

Diagnostic statistical criteria, such as AIC, VIC, AWE, are available to determine the optimal number of segments.

LCR typically includes three simultaneous steps: identifying segments; using covariates (e.g., demographics) to predict class membership; and, classifying cases into appropriate segments.

Regression coefficients such as shown in the general form of a two-segment solution 98 illustrated in FIG. 9 differ by segment indicating the direction and relative importance of each predictor in relation to the given criterion. This yields segment-specific regression equations and/or lines.

The statistical analysis of wedge variable data preferably yield quantitative measures indicative of the degree to which given wedge variables may serve as predictors for the target population. Based on the results of statistical analysis, then, the wedge variables are ranked to identify the most powerful of the wedge variables in effectively segregating respondents, hence the most powerful indicia for reliably identifying the segregated class of respondents to which any one particular respondent may belong. Segments are defined according to these most powerful of wedge variables based on application-specific criteria, and an optimal number of such segments for the intended application are determined.

Depending on the application-specific criteria, segments may be defined such that they correspond to at least one ranked wedge variable and one or more other correlating wedge variable. Many segmentation solutions are possible, and an optimized set of segments are preferably identified upon iterative analysis of possible solutions responsive to application-specific selection criteria. Selection criteria may include the degree of relevance to the given implementation of each segment definition, the statistical validity of the segmentation, the feasibility of execution, and any other such factors suitable for the intended application. Once a segmentation solution has been chosen based upon the most determinative group of wedge variables, the responses to all of the questions are analyzed in order to characterize and/or label each segment.

New data sets may be used as they are acquired to continually improve and/or further delineate new segments within each segment, creating further child nodes. A psychographic profiling model is thus created for each segment. The resulting hierarchal tree may then be consulted for each respondent to assign that respondent to the appropriate segment.

In the example of FIG. 3, diabetic patients are profiled in the illustrated portion of the hierarchal tree obtained after segmentation. The class of all diabetic patients 30 is further classified in its succeeding child node 1 according to diabetes type 31, 32. Each diabetic type class is in turn further classified in its succeeding child node 2 according to personal psychographic attributes. For the class of type 1 diabetics, the psychographic profiles may include "committed treaters" 33 who tend to be highly compliant and responsive to treatment directives as indicated at block 33*a*; "hesitant compliers" 34 who tend to follow treatment directives though with less consistency as those in the first segment as indicated at block 34*a*; "ignorant deniers" 35 who tend to altogether lack sufficient appreciation of their condition and reject the notion that they are ill as indicated at block 35*a*; and, "invisible sufferers" 36, who fail to consult a medical professional unless in a crisis (such as an Emergency Room situation) as indicated at block 36*a*.

Referring more generally to the illustration of FIG. 2, each respondent may be uniquely profiled with reference to the hierarchal tree. A respondent in the example shown is profiled to be a "2-3-1 patient." That is, the respondent is a patient who belongs in class 2 within the parent node, class 3 within the first child node, and class 1 within the second child node.

Referring back to FIG. 1, a typing tool, or a subset of key wedge variables, is preferably created at block 150 to enable quick and easy classification of respondents by asking fewer questions rather than the complete battery of questions identified as wedge variables. Utilizing suitable typing tool statistical modeling techniques known, a mathematical approach is derived to classify each segment based on the wedge variables. The typing tool thereby created mathematically defines the classification of a profile, such that whether or not a respondent fits the profile may be quickly determined without resort to full analysis of all the responses and supplemental information available for that respondent. Statistical modeling techniques which may be suitably applied in this regard include discriminate function analysis, multinomial logistic regression, classification and regression trees, as well as others.

Multiple typing tools, or mathematical models, for delineating segments are preferably created and captured in a database, cross-referencing questionnaires and responses for use in a production environment, employing software APIs (application programming interfaces), web browsers, applets, transaction processing systems, and the like. Each psychographic profile is thereby referenced by a subset of wedge variables, requiring evaluation of responses to just a subset of the questionnaire with demographic and health data to profile a particular respondent. Typing tools are generated so as to accurately identify and profile each individual respondent, preferably with an accuracy rate of 70% or higher.

The segmentation process of portion 100 is repeated until all needed classifications of parents and child nodes are completed. Profile of psychographic grouping is captured into a database for lookup against new data. Sources of new data may include a file of responses, online responses from a web server, and telephonic or direct face to face communication of information or secondary data (pharmaceutical, claims, health insurance, or other such information).

Once the intended hierarchy is completed, the psychographic profiles and cross referenced wedge variables are applied at block 210 (portion 200 of the system) for use in classifying individual respondents and prescribing further appropriate action. The database is then integrated into the software systems of the intended application by any suitable means known in the art. The database is generally made available for use over the internet on a web browser, integrated into server based client-server applets or integrated as part of other statistical modeling or transaction processing systems as through an API (application programming interface). Preferably, new data may be processed at block 230 in both real-time and in batched processing environments to forecast attitudinal and behavioral segments of each individual.

Figure 11:
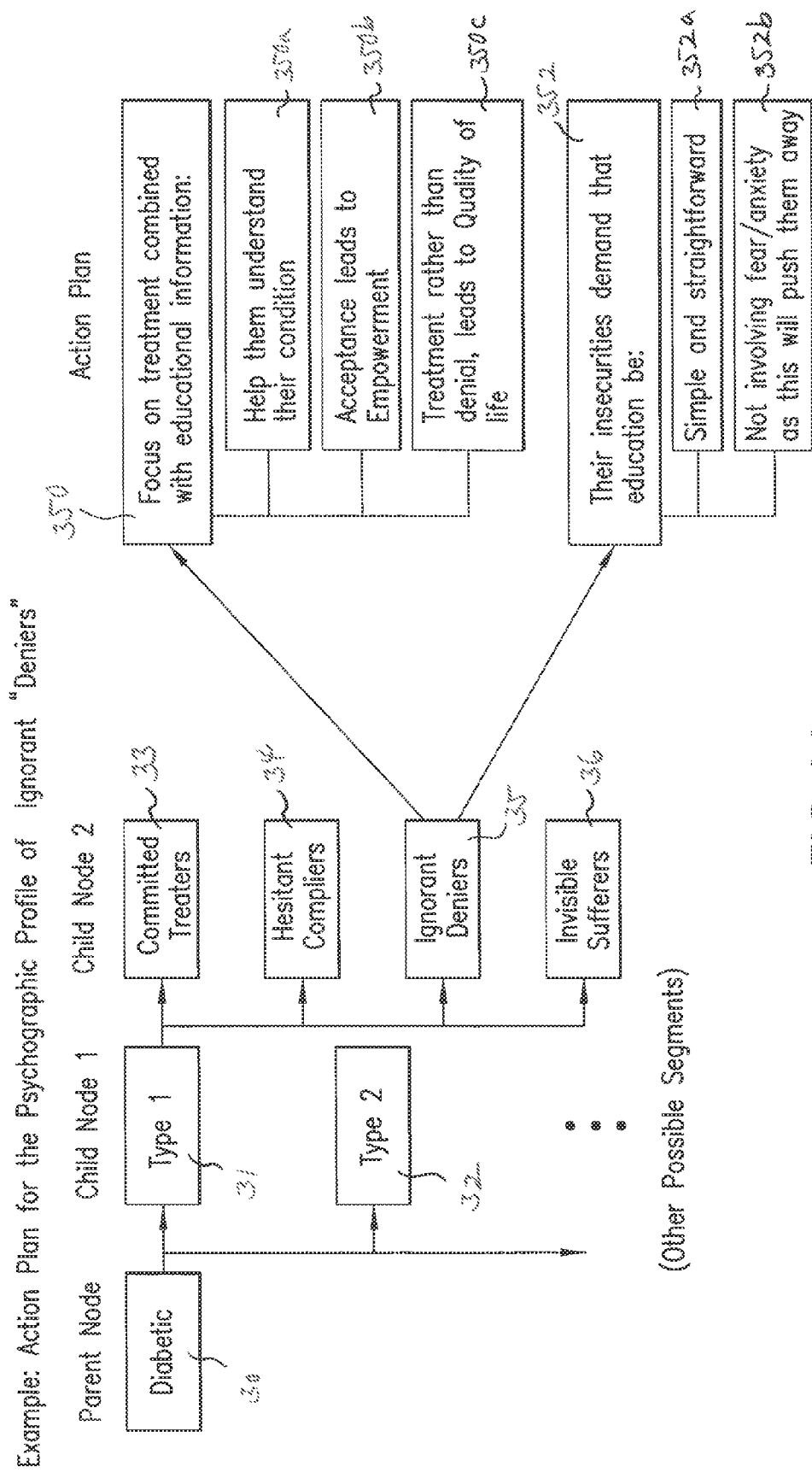
FIG. 11 is a schematic diagram illustrating a specific example of an action plan assigned to a segment identified in the portion of the hierarchal tree illustrated in FIG. 3.

Each node of the hierarchal tree is analyzed at block 240 to realize standardized and effective positioning, messaging, marketing, treatment plan development, and better health management techniques for each profile. FIG. 11 illustrates a possible action plan resulting from such analysis for the class of "ignorant deniers" 35 exemplified in FIG. 3. The standardized plan for this class of patients may be, for instance, to focus on treatment combined with education 350 to aid their understanding and acceptance of their condition (see blocks 350*a*-350*c*). The insecurities underlying the tendencies of these individuals require the educational measures to be simple and straight forward, and carefully crafted for these persons particularly prone to fear or anxiety accompanying newfound medical awareness (see blocks 352, 352*a*-352*b*). By analyzing each node, specific sets of action plans are so obtained and linked to each segment or node.

Figure 12:
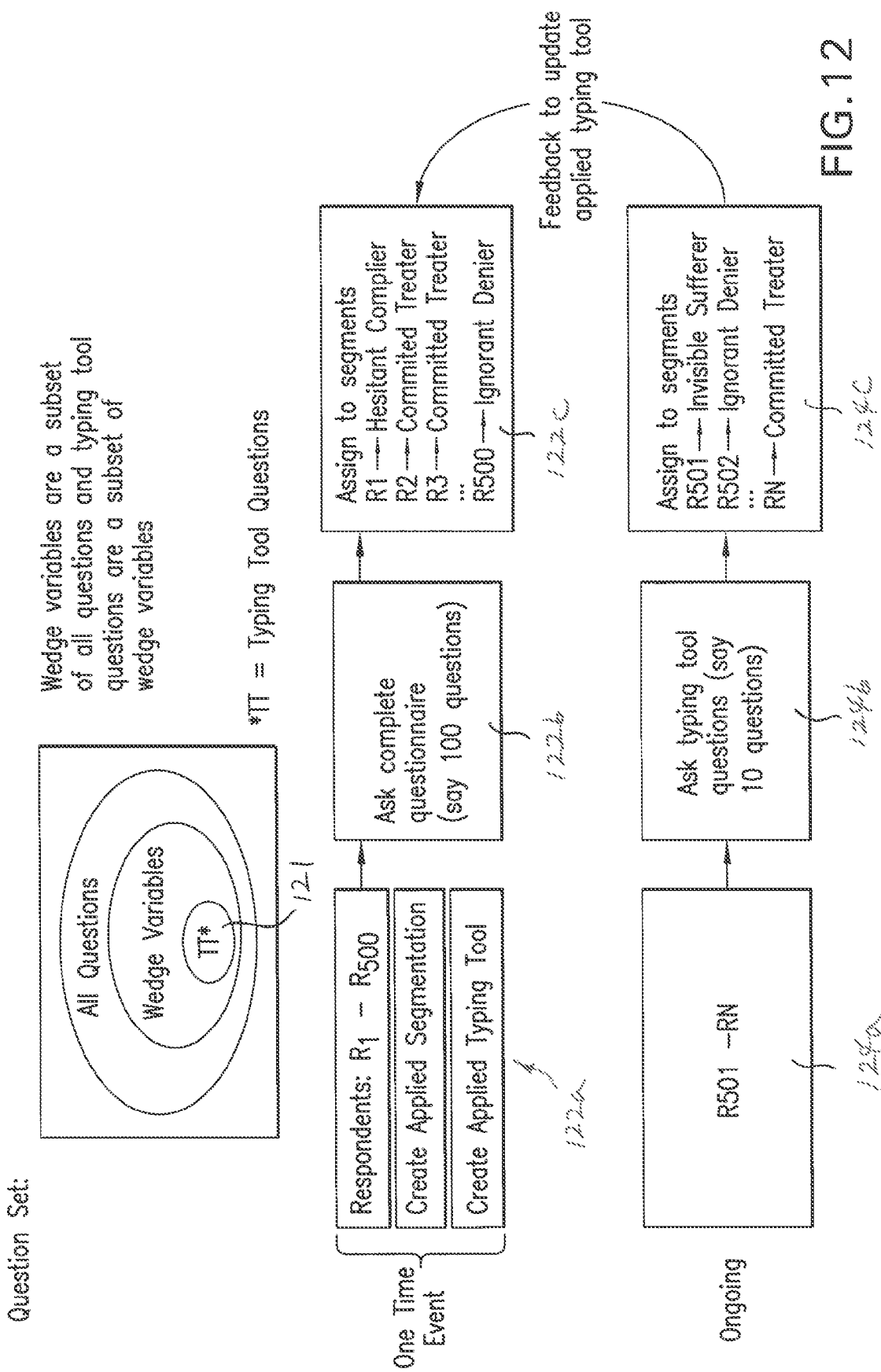
FIG. 12 is a chart illustrating a questionnaire approach employed in accordance with one exemplary embodiment of the present invention.

Turning to FIG. 12, responses from the wedge variables (or wedge questionnaires) are processed utilizing the developed applied models and typing tool formulas to predict and classify the individual into specific segments. While the initial development of psychographic profiles and creation of typing tools 121 is a one-time event (see blocks 122a-122c), based on a sufficiently large pool of respondents' data, their updating remains ongoing. Additional data acquired through new respondents is added continually as use is made of the system. The segmentation process (in at least an abbreviated form) (see blocks 124a-124c) is carried out to update the profiling segments and/or refine the typing tools. The database is correspondingly updated with further information, and additional action plans are prescribed and linked, if necessary, to specific segments.

Figure 13:
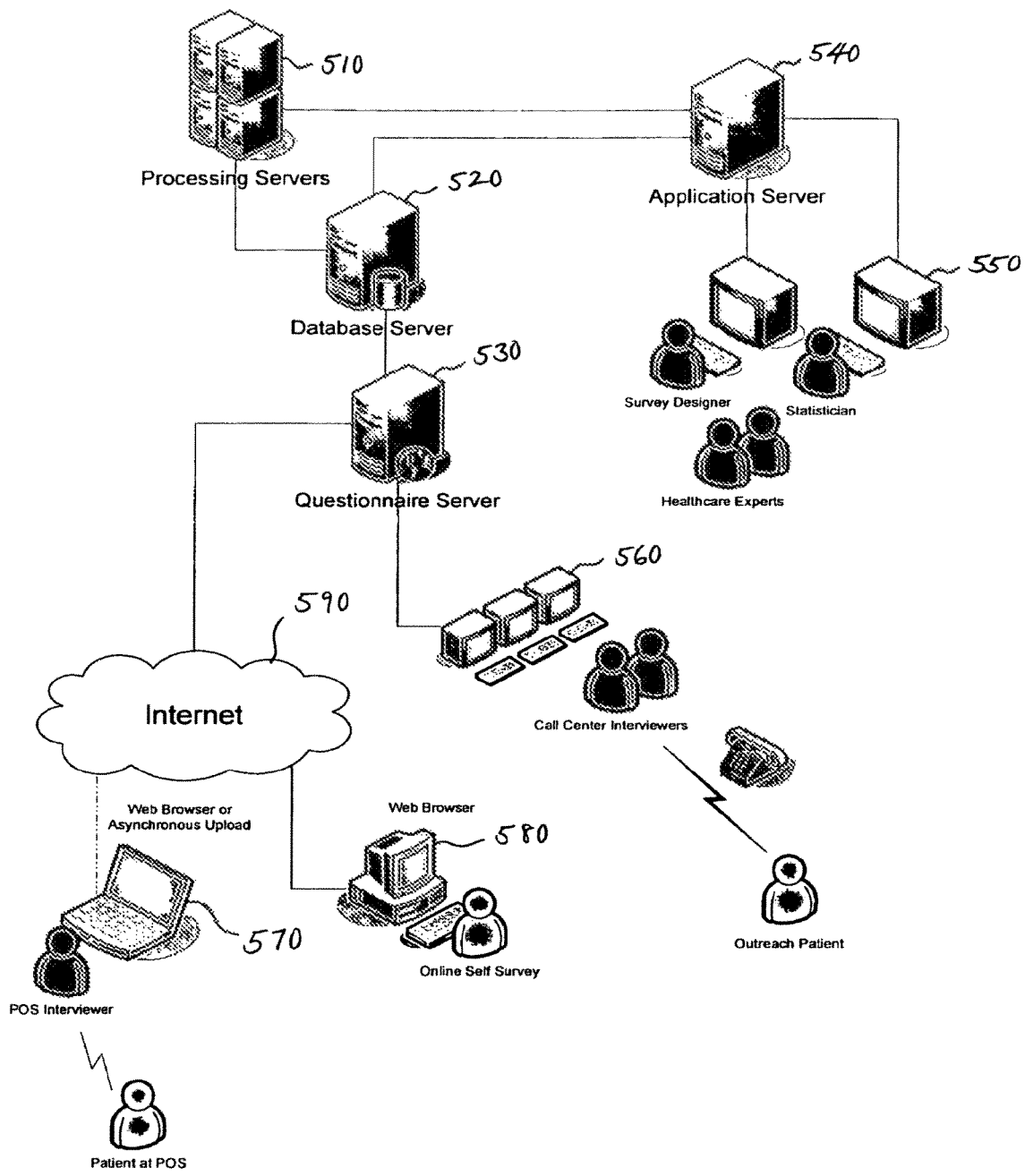
FIG. 13 is a diagram schematically illustrating a functional arrangement of system components in one exemplary embodiment of the present invention.

Exemplary embodiments of the present invention are preferably implemented as a system of interoperable software applications suitably embedded for execution in one or more host platforms, such as servers dedicated to certain functions and microprocessor based workstations. FIG. 13 is a diagram schematically illustrating a functional arrangement of hardware components in a system 500 established in accordance with one such exemplary embodiment of the present invention, for building and utilizing psychographic profiling models.

System 500 preferably includes a plurality of processing servers 510 which provide the processing power to execute the many analytical computations required for variable selection and segmentation solution development, as well as the various sorting, searching, or other computational functions requisite to developing and launching one or more psychographic profiling models. The system further includes database server 520 which serves to control upkeep and access to the system's warehouse of data, and a questionnaire server which serves to control acquisition and/or administration of the survey questions and primary/secondary data. The system also includes an application server 540 coupled preferably to the processing servers 510 and database server 520, which maintains the psychographic profiling models in their application-specific form.

Various levels of users—for example, survey designers, statisticians, health care experts, or other advisory users at one level; call center interviewers at another level, and point of service (POS) interviewers or online self-survey takers at yet another level—may then access the system through fixed or portable work stations 550 560, 570 linked for communication with either or both of the application and questionnaire servers 540, 530. Depending on where the users are located, they may establish a communication link with either of these servers via the internet 590. In the example shown, the point of service interviewer and online self-survey taker work stations 570, 580 are linked to the questionnaire server 530 in this manner, via the internet.

At the initial model development stages, the survey designer, statistician, health care experts, or other skilled advisory users interface with the system preferably to first generate the survey questionnaires' questions, then advise the optimization of segmentation solutions in the resulting application-specific models. Users at the call center level, and at the POS interviewer and online self-survey level, collect and enter responses to the survey questions to accumulate responses from a sufficient sampling of individuals (patients in the illustrated example) making up the targeted population of interest to yield statistically valid segmentation solutions. Once the necessary processing takes place to formulate the desired segmentation solution(s) and corresponding typing tool(s), the typing tool(s) may be administered to individual patients needing to be psychographically profiled, via the call center, POS, or online self-survey work stations 560, 570, 580. The typing tool responses are then passed by the questionnaire and database servers 530, 520 to apply the proper profiling model at application server 540. Thereafter, the resulting profile and any action plan prescription are duly disseminated for the respondent patient's benefit.

A plurality of graphic user interfaces (GUI) to the system are preferably established at the various user level workstations, whereby a user may quickly and conveniently access and control system components and their operation through. Preferably, the computer programs driving system operation in this regard (such as web browsers) are launched as layered frames which host the given software applications. The programs may employ any suitable user interface elements known in the art. Where necessary, extended or custom controls may be incorporated to simplify the resulting user interface.

The data storage employed by system 500 may be of any suitable type known in the art. A Relational Database Management System (RDBMS), for example, may be preferable in those embodiments wherein relationship definitions between entities are supported. It is important for efficient system performance that the database management measures employed be sufficiently robust to accommodate storage and retrieval of large data volume, while being structured to accommodate efficient comparison and correlation of attributes on distinct files or records.

Figure 14:
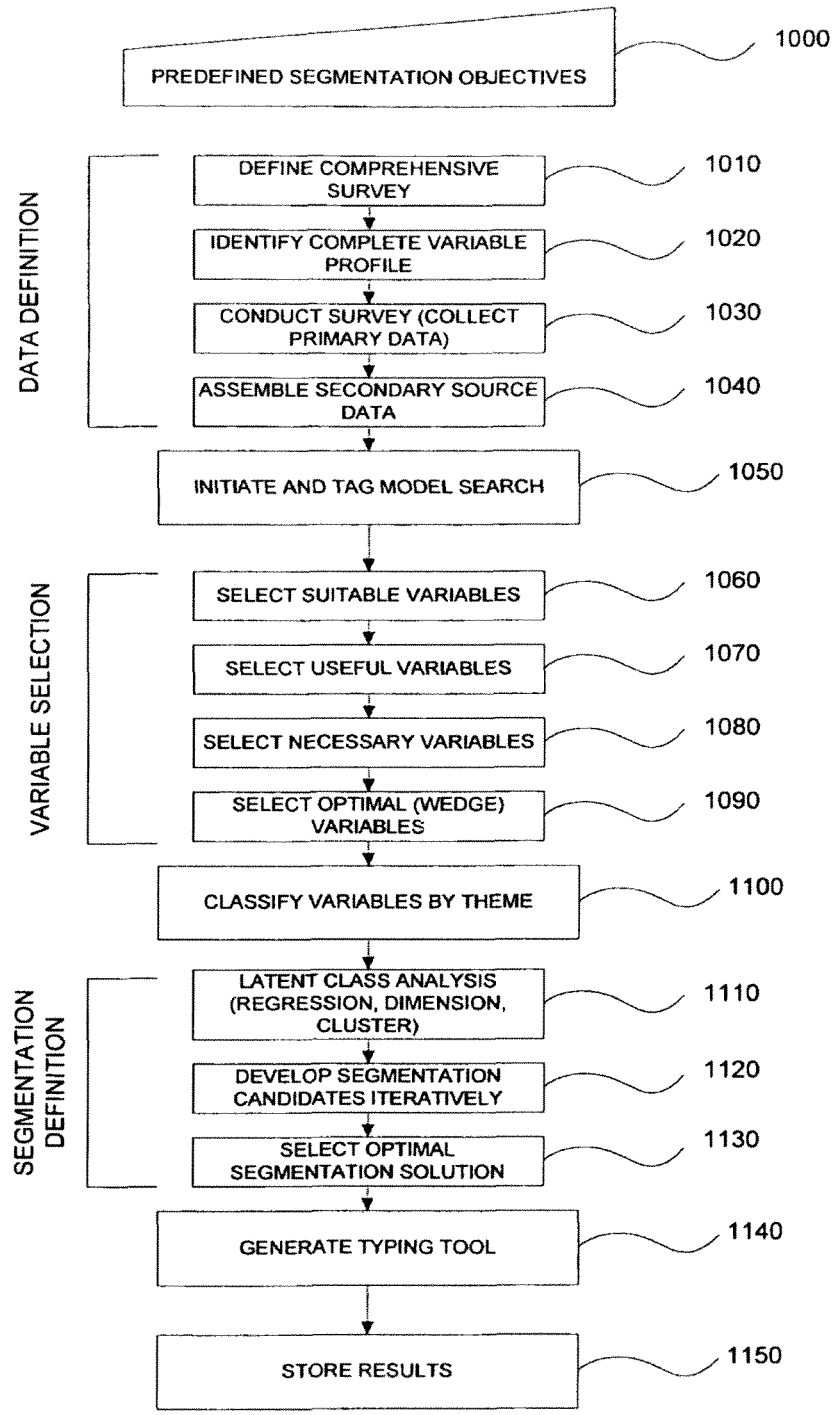
FIG. 14 is a flow diagram schematically illustrating a flow of processes for implementing a psychographic segmentation portion in accordance with one exemplary embodiment of the present invention.

Referring now to FIG. 14, there is shown a flow diagram schematically illustrating a flow of processes for implementing a psychographic segmentation portion 100 (FIG. 1) in accordance with one exemplary embodiment of the present invention. The processes shown are preferably implemented in software stored in a computer readable medium. Portions of these processes may incorporate, where suitable, known components which may be commercially available individually, such as database tools, reporting software, integration code, automation services, manual input interfaces, statistical analysis tools, and the like.

As described in preceding paragraphs, psychographic segmentation portion 100 is used to develop one or more programmable models for systematically and objectively classifying a population of interest (such as certain populations of healthcare consumers) according to a set of highly discriminating segments. In accordance with one aspect of the present invention, the models are formulated in such manner that distinct groups of the population are profiled to reveal their shared psychographic, behavioral, and attitudinal tendencies, such that optimal and efficient messages may be presented to the profiled population groups for suggested medications or other medical therapies to improve compliance or bring about the desired effects upon individuals belonging to the distinct group. In the healthcare consumer example, psychographic information obtained from profiling ensures the generation of healthcare-related content that is likely to be highly persuasive upon the profiled consumer. For example, healthcare consumers sharing a particular set of segmented attributes may, in light of their shared profile, be especially receptive to direct marketing of options for improving overall health or lowering overall costs of healthcare and insurance.

Toward the end of obtaining such practically meaningful profiling, segmentation is based on factors which are highly actionable for change. Suitable methods and analytical tools known in the art are employed in this regard to ultimately generate a typing tool which reduces the amount of data required to reliably profile a patient in this manner. As described in preceding paragraphs, segments are defined in the initial model development stages according to certain variables identified for notable acuity in distinguishing those qualities and attributes effectively shared only by a unique part of the overall population of interest. These variables may be demographic, psychographic, behavioral, and/or attitudinal in nature.

At block 1000, predefined segmentation objectives are accordingly established to guide the segmentation process in desired manner for the given population of interest. These objectives provide the direction in which to continually drive qualitative choices arising in the processes. Depending on the specifics of the intended application, the stated objectives may be relatively broad. For example, one objective may generally be to identify high risk patients concerned about their health. The objectives may be quite specific in other cases. An example of such may be to identify employees with diabetes within a company who are prone to foregoing required insulin shots because of the pain, but are otherwise open to alternative treatments and remain receptive to a call from a health care professional to discussing alternative treatments. Regardless of scope, the predefined segmentation objectives, while conceptually established and articulated, are preferably reflected only implicitly in such system features as selection criteria, tuning parameters, and/or manually input information.

Obviously, different intended applications, different fields of endeavor, different subject matter of interest, and different makeup of the population pool will necessitate different segmentation objectives. Examples of such segmentation objectives in a healthcare context, with the population pool made up of current and perspective patients or healthcare service recipients, may include:
 1. Defining which groups of individuals are most responsive and least responsive.
 2. Determining which of the most responsive individuals represent the greatest potential beneficiaries of certain products/services.
 3. Determining what the most responsive groups need to hear before actually acting/participating.
 4. Determining how the most responsive groups may be motivated and reached with a message.
 5. Delivering customized messages to the responsive groups based upon quantitative data indicative of the groups' personality, motivations, level of understanding, or the like.

Once the predefined segmentation objectives are clearly established, the data definition process may proceed. This process includes first defining at block 1010 a comprehensive survey consistent with the predefined segmentation objectives. Preferably, the collective expertise of learned individuals ('advisory' users) in various areas of heathcare or any other field of interest in the intended application is brought to bear in generating a suitable survey. A plurality of questions pertaining to the relevant subject matter are created with the benefit of such expertise, then entered and recorded in the system. The resulting survey, preferably in the form of a personal questionnaire, is geared toward evoking psychographic information about the responding individual, including the individual's tendencies, attitudes, wants, and needs. For example, certain questions of the survey may induce responses which indicate the respondent's attitude and/or perception as to the effectiveness of a particular treatment, or the respondent's attitude and/or receptiveness or aversion to physician advice.

Other more objective information, such as demographic and behavior history data may, but need not be, included in the survey. More objective information like this may be readily gathered from secondary sources such as insurance eligibility listings, claims histories, and the like.

In accordance with one aspect of the present invention, the survey questions are stored in the system to be available for further analysis as such, even apart from the survey responses. Preferably, the survey structure, or schema, is described for the system in this regard, independent of any responses thereto.

Each of the questions is categorically defined, for example, by its type, its text, and its response choices. The system preferably employs a plurality of predefined question types which determine, in part, how easily the response data may be statistically processed for use in the final model. Examples of question types that may be employed are shown below:

Question Types:

Single Response

Example

Which of the following best describes your employment status? (Please select one answer only.)

| | | |
|---|---|---|
| 1. | Employed full-time | ☐ |
| 2. | Employed part-time | ☐ |
| 3. | Homemaker full-time | ☐ |
| 4. | Not employed, due to epilepsy/seizures | ☐ |
| 5. | Not employed, but not due to epilepsy/seizures | ☐ |
| 6. | Retired | ☐ |
| 7. | Other [ANCHOR] | ☐ |

Multiple Response (Select all or select a specific number >1)

Example

Do you ever search for information on the Internet on any of the following health-related topics?

(Please select all that apply.) [ROTATE]

| | | |
|---|---|---|
| 1. | General health information | ☐ |
| 2. | Information on diabetes | ☐ |
| 3. | Information about medicine a doctor recommended/prescribed | ☐ |
| 4. | None of the Above [E; ANCHOR] | ☐ |

Scaled Response

Example

Overall, how knowledgeable are you about prescription medicines that are available to treat diabetes?

Please choose any number from "0" to "10," where a "0" means you are "Not at all knowledgeable," a "5" means you are "Somewhat knowledgeable," and an "10" means you are "Extremely knowledgeable." (Please select one answer only.)

| Not at all Knowledgeable | | | | | Somewhat Knowledgeable | | | | | Extremely Knowledgeable |
|---|---|---|---|---|---|---|---|---|---|---|
| 0 | 1 | 2 | 3 | 4 | 5 | 6 | 7 | 8 | 9 | 10 |

Ranking

Example

Which of the following asthma patient support materials are of most interest to you?

Please rank order the six types of patient support materials below, assigning a "1" to the item you are most interested in, a "2" to the item of second most interest, and on down to a "6" to the item that least interests you. [ROTATE]

| | | |
|---|---|---|
| 1. | Waiting room brochures on asthma medications | — |
| 2. | Website for patients with information and instructions on the use of asthma medications | — |
| 3. | Videos/DVDs for patients with information and instructions on the use of asthma medications | — |
| 4. | Asthma diaries in which patients may record exacerbations, the use of short-acting "rescue" therapies, etc. | — |
| 5. | Funding of asthma-related patient support and informational groups | — |
| 6. | In-home training from a nurse/hospital educator on how to correctly use asthma medications | — |

100-Point Allocation (Either Points or Percentages)

Example

Consider the characteristics of a diabetes medicine listed below. Please assign a total of 100 points to the characteristics shown, giving characteristics that are more important, more points, and characteristics that are less important, fewer points. (Each value you assign must be between 0-100 points, with the sum of points equal to 100.) [ROTATE]

| | | |
|---|---|---|
| 1. | Is not injected | — |
| 2. | Minimal side effects | — |
| 3. | One dose controls glucose levels for 12 hours | — |
| | TOTAL | 100 |

Open-Ended

Example

Please list the brands of diabetes medicines of which you are aware.

Reliably ascertaining attitudes, behaviors, demographics, and other information personal to a respondent through a questionnaire requires properly varied sets of question types. On the one hand, the question types must optimally promote accuracy of response, while on the other hand ensure that the responses are based on a clear understanding of the question by the respondent. Additionally, for the technical purposes of segmentation, scaled responses are particularly useful because they expand the variability of responses (for example, offering 11 response choices on a 0-10 point scale). Variability in responses is preferably one of the criteria on which selection of "wedge" variables is based. Typically, 40-60% of the questions in a questionnaire developed for the purposes of segmentation are questions invoking scaled responses.

In the presentation of response choices, the response choices are preferably rotated (in the order displayed for selection by the respondent) in the questionnaire methodology. This serves to mitigate the potential bias that might otherwise result from the particular positioning of answer choices relative to each other.

Referring back to FIG. 14, the flow proceeds from block 1010 to block 1020 wherein a complete variable profile is identified for the data to be acquired. The data schema for all data sources (survey, secondary sources, manually entered information) are provided as inputs for this process. Survey questions resulting from block 1010 form a subclass of the variables being profiled, each question preferably constituting a variable. Also, information resulting from manual selection or entry by a user also forms a subclass of variables. Secondary sources, on the other hand, typically require an effective 'reverse engineering' or other process on their stored data file layout to extract (or interpret) the level of information suitable for use as a variable. Any suitable means known in the art may be used in that regard. A complete description of all available variables is thus obtained as a superset of the survey questions, manual entries, and schema of secondary sources.

The description of data variables may be recorded in the system using any suitable technique known in the art, such as database tables which describe schema information, structured files like XML files, or merely extrapolating from the data source schemas themselves. Preferably, the technique to be employed is selected based upon the efficiency with which the variable profile may be managed—that is, with minimum processing overhead and without required modification of the source 'raw' data. The process at this stage is effectively one of data description, not data cleansing.

Regardless of the data recording/management technique employed, variable analysis begins preferably with the following base properties defined for each variable:

a. Data type: This includes system type plus constraints that define possible values. For survey questions, the data type is directly related to question type. However, to accept data from secondary sources, additional data types may be required. Examples include Boolean, date/time, numeric, and character data.

b. Primary key identifier: This is a designation unique to the variable within the system and may be used for identification purposes as it is processed. The designation may have meaning only within the context of the system or potentially carry some extra meaning on its own, and may be system generated, or user supplied. Examples include:

Variable counters (V1, V2, V3, etc);

Variable names (Gender, DrugCode, etc.);

Globally unique identifiers {0AC517C9-0BC0-4895-99B7-FC061D4FD4F1}, {10020200-E260-11CF-AE68-00AA004A34D5});

Other randomly generated keys;

Other systematically generated key;

Other user supplied keys.

If the identification is user supplied, a uniqueness check constraint is provided within the system. The preferred embodiment uses system generated identification to limit redundant, tedious, and error-prone data entry by the system user. A key that carries extra meaning is not relevant, as other attributes of the variable are available to imbue meaning as to data content. Such other attributes may be de-referenced when analysis results are presented to the system user (the model builder).

c. Source reference: This is reference to the data source element which supplies the data for the variable. Examples of the content of source data include:
  Survey results;
  Employee eligibility files;
  Pharmaceutical claims;
  Medical claims;
  Lab results;
  Marketing lists;
  Other behavioral data;
  Other psychographic data;
  Other demographic data.
Examples of the media for source data include:
  Database tables;
  Text files;
  Datasets retrieved from a web service call;
  Manual input;
  Other proprietary data storage technology.
A preferred embodiment utilizes a two part reference: a dataset location and a data element offset at that location. Specifically, this may be the name of a database table and field, or may alternatively be a file path and column position. More generally, it may be any reference parameter collection within an established system that looks up and returns the actual data for the variable as an output.

d. Selection Level: This is a property which tracks the variable through the variable selection and model search process. It preferably starts at an initial level to indicate that no analysis has yet been performed on the variable to require inclusion or exclusion in the final model. The selection level may be a direct attribute or an indirectly related attribute. That is, it may be directly ascribed to a variable and have meaning globally for selection in a single segmentation solution search. Alternatively, it may be related to batches or runs which indicate the given variable's selection within the context of any of multiple solution searches.

Analysis of the variables preferably yields various metadata attributes for each. These attributes lend insight into the meaning of the variables' data and guide advisory users of the system to draw appropriate conclusions on the usefulness of derived segmentations. Each variable preferably includes such attributes as category and theme, along with a 'common name' designation.

At block 1030 the full survey is preferably conducted to collect primary data from respondents belonging to the targeted population of interest. The survey may be administered by any suitable means known in the art. For instance, they could simply be distributed to respondents belonging to a sampling of population groups. Alternatively, the surveys could be verbally conducted by call center operators communicating by telephone with respondents, or by POS interviewers—for example, at physicians offices—through direct interview or filled paper form. The surveys may also be self-conducted by respondents through online or other user-initiated sessions. The response data acquired from the surveys is entered and recorded preferably in a common structured format.

The conduct survey block 1030 is shown in FIG. 14 to follow the variable profile identification block 1020, but in alternate embodiments, the survey may be conducted prior to completion of variable profile identification, so long as the survey has been sufficiently defined as indicated at block 1010. Normally, practical considerations limit initial administration of the survey to but a sampling of the entire population of interest. To supplement the survey response data, information extracted from secondary sources such as pre-existing marketing surveys or other such material, and their analysis, may also be acquired.

The data definition process is completed at block 1040 where data from one or more secondary sources is acquired and assembled. Suitable data input tools are incorporated in the system to preferably place the data in common tables/files. Consolidation of the secondary data with primary data serves to round out profiles of individuals in the resulting segmentation model. Though information from secondary sources may generally be more objective than, say, scaled responses to personal survey questions, such secondary source data often contains information directly relevant to development of the model and the segmentation objectives. For example, the secondary data may provide behavioral, demographic, or other information which serve to substantiate information gleaned from primary data.

Preferably, data from secondary sources is aggregated into a common format with data from primary sources like the survey, for consistent and systematic processing therewith. If any general data cleansing processes are to take place, they are carried out during the primary data collection stage at block 1030 and/or this data assembly stage at block 1040.

The flow proceeds from the data definition processes to block 1050 where the given model search effort is configured (preferably in user-selective manner) with the required initiation and tagging of system parameters. Inputs to the process include the full set of variables (survey questions, schema of secondary sources, and other potential discriminants for categorizing members of the targeted population into profiled groups), the primary and secondary data acquired, and the segmentation objectives. The process is executed to establish and build a repository of models preferably using "batches" which contextualize the model searches. Records for each new batch are initiated using process parameters from the preceding batch, then updated or tuned for carrying out the search, before the search operation is actuated.

The process of block 1050 also generates a designation by which to archive and locate the given model and its parameters in the repository of models. For example, the date and time at which a particular model search batch was initiated may serve as a designation. Other attributes, such as details of the sample group, may also contribute to the designation. The process of block 1050 may further yield classification of a model resulting from a search in a hierarchal tree.

Blocks 1060-1090 collectively define the wedge variable selection processes, whereby the variables for optimally discriminating groups of individuals in the targeted population are obtained in view of the predefined segmentation objectives. At block 1060, the superset of available variables and the corresponding primary and secondary data are initially examined for any invalid data and may be validated using other statistical methods for suitability. Those variables having sufficiently complete corresponding data are selected as suitable variables by this process and passed to block 1070 for further selection of useful variables therefrom. Various known measures may be employed to analyze and detect the suitability of variables in this manner. Preferably, the option of partially or wholly overriding this suitability check to afford a more streamlined variable selection process where necessary is made available to advisory users.

At block 1070, the variables emerging from the selection process at block 1060, namely the pre-screened suitable variables, are reviewed and evaluated to determine whether or not they are viable candidates to serve as wedge variables providing highly effective segmentation. Histogram reviews of the response or other data corresponding to given variables, as illustrated in preceding paragraphs, are carried out at this stage. Preferably, other statistical evaluations, such as standard deviation evaluations, supplement the review. The selection level properties of variables are accordingly updated to the extent indicated by this review of corresponding data.

Ideally, a minor portion of the suitable variables emerging from the process of block 1060 are identified at this stage as those sufficiently useful for further consideration as wedge variables. As also described in preceding paragraphs, a thresholding or other suitable technique may be employed to detect and responsively set the selection levels to limit the class of useful variables to only the most promising of the suitable variables.

The categorized set of useful variables resulting from block 1070 are then passed to block 1080 where one or more statistical methods known in the art, such as factor analysis, multiple linear regression, and the like, are adapted and executed on the variables' corresponding data to accordingly update their selection level properties further. Results of the statistical analyses identify sufficiently common factors to further classify certain useful variables as necessary variables—those variables that optimally discriminate between or polarize individuals into various groups in the given sample.

Additional analysis is typically performed so as to identify "Key Driver" variables. These variables are strongly correlated with one or several other variables that are direct questions about the central focus of the research. Identifying and including such key variables as wedge variables intelligently informs the segmentation so that the created segments may be accorded varying levels of importance. For instance, if the goal of the research were to identify diabetes patients who would be more compliant with their treatment regimen if they received free diabetic supplies, key driver variables may include those whose responses were highly correlated with the question: "I would be more compliant with my diabetes treatment regimen if my diabetic supplies were free."

The processing flow then proceeds to block 1090 where the optimal, or wedge, variables are selected. Block 1090 receives as its inputs the necessary variables, Key Drivers, and the statistical analyses results (such as factor analysis results, cutoff criteria, . . . ). Preferably, the necessary variables received at block 1090 are ordered according to relevant ones of their properties, and the most highly ranked of the variables selected therefrom. The criteria for this selection of variables in this manner will depend on the specific requirements of the intended application and the segmentation objectives to be realized. Perhaps the simplest selection criteria may be threshold-based, with certain predefined cutoff criteria to be imposed in view of one or more system parameters.

The wedge variables identified at block 1090 are subjected to a classification process at block 1100 for classification by category and/or theme. Depending on the nature of the classification involved, a degree of manual analysis may be preferable to properly ascertain the appropriate category and determine the thematic aspects of the given variables. While this classification process may be carried out earlier (for instance, during creation of the survey where manual advisory oversight may be required in any event), minimizing the number of variables to review and analyze is preferable, particularly since at least some degree of manual analysis is to be relied upon. Carrying out the classification process 'as late as possible' upon just the wedge variables thus avoids considerable waste of effort and time. Such classification of variables is required for proper latent class analysis in formulating a useful segmentation solution. Examples of question categories and themes on which to base this classification follow:

Category: Attitudinal

Purpose of Category: Appeal to target segments with customized language, tone, message that resonates with their attitudes and beliefs.

Themes:

Level of (perceived) Knowledge
- How knowledgeable do you consider yourself to be about _health condition_? (scaled response)
- Level of agreement: I'm too young to need _test_ (scaled response)
- Level of agreement: An abnormal _test_ means you will probably have _condition_ (scaled response)
- Which of the following does a _test_ test for? (multiple response)
- What are the causes of/risk factors for _condition_? (multiple response)
- Which of the following conditions, if any, are caused by _condition_? (multiple response)

Level of Concern
- How concerned are you about your _health condition_? (scaled response)
- How concerned are you about getting _health condition_ in the future? (scaled response)
- How at risk do you think you are for getting _health condition_ in the future?
- Level of agreement: I worry about my health more than most people I know (scaled response)

General Health
- Level of agreement: I don't trust the healthcare system/ my insurance company/ (scaled response)
- Level of agreement:

Responsibility for Health (self/others)
- Level of agreement: If I become sick, I have the power to make myself well again (scaled response)
- Level of agreement: I am directly responsible for my health (scaled response)
- Level of agreement: My physical well-being depends on how well I take care of myself (scaled response)
- Level of agreement: I can best maintain my health by relying on my doctor (scaled response)
- Level of agreement: I am doing all I can to maintain a healthy diet (scaled response)

Relationship with Doctor
- Level of agreement: I trust my doctor to always recommend what is best for me
- Level of agreement: I rely solely on my doctor for advice on what medicines/vaccines are right for me
- Level of agreement: My doctor does not spend enough time talking to me during an office visit
- Level of agreement: My doctor is extremely knowledgeable about _condition_

Degree of Information Seeking
- Level of agreement: I always ask my doctor for details about the medicine prescribed for me (scaled response)
- Level of agreement: Before I take a prescription medicine, I do a lot of research on that medicine
- How interested would you be in receiving personalized information about _healthcare condition/topic_?

Prescription Medicines
- Level of agreement: I always worry about the side effects of medicines
- Level of agreement: I prefer to use over-the-counter instead of prescription medicines Level of agreement: Prescription medicine is much more effective than over-the-counter medicine
Level of agreement: If a prescription medicine is approved by the government for use, it must be a safe medicine
Level of agreement: If a prescription medicine is approved by the government for use, it must be an effective medicine
Level of agreement: I would rather use alternative medicine (physical therapy, acupuncture, etc.) than take prescription medicine
Level of agreement: I prefer to take herbal supplements instead of prescription medicines
Level of agreement: I don't trust the companies that make prescription medicines
  Cost consciousness
    Level of agreement: I am willing to make the extra effort to find lower prices for products
    Level of agreement: I try to use coupons whenever possible to purchase products
    Level of agreement: I have asked my doctor to switch me to a medicine that was less expensive
    Level of agreement: I have done things like cut my pills in half or skip a dose of medicine to make my prescription last longer Category: Psychographic
Purpose of Category: Understand the segments' mindset and personality.
  Themes:
  Health Proactivity
    Level of agreement: Routinely monitoring my _condition_ is an important way to stay healthy (scaled response)
    Level of agreement: I have to be proactive to be sure I get the best care my doctor (scaled response)
    Level of agreement: I try to do everything I can to keep myself healthy (scaled response)
    Level of agreement: I usually keep up with the latest advances in health and science (scaled response)
    Level of agreement: Many of my friends do more than I do to practice preventative healthcare
    Which of the following vaccines, if any, have you had in the past 5 years? (multiple response; flu, pneumonia, tetanus, cervical cancer, etc.)
  Early adopters
    Level of agreement: I always want to be the first to have the newest technology (scaled response)
  Level of Influence
    Level of agreement: I am usually the one to tell my friends about a new website (scaled response)
    Level of agreement: Friends and family often ask me for advice about healthcare
    Level of agreement: People often ask me where I bought something that I am wearing (scaled response)
    Level of agreement: I am usually able to influence people to do what I want
  Lifestyle
    Level of agreement: I don't have the time to do everything I should to keep healthy (scaled response)
    Level of agreement: I don't have enough time to do the things I want to do
    Level of agreement: My life is full of stress
    Level of agreement: I live an active life
  Personality
    Level of agreement: I love to socialize
    Level of agreement: I have trouble making decisions
    Level of agreement: When I am with a group of people, I tend to be the leader
    Level of agreement: I am easily embarrassed
    Level of agreement: I frequently contribute time or money to worthy causes
    Level of agreement: I tend to be a procrastinator
    Level of agreement: I like to plan out my day ahead of time Category: Needs
Purpose of Category: Identify unmet needs and areas for improvement; Gain insights on positioning of product/service.
Category: Behavioral/Behavioral Intentions
Purpose of Category: Budget the allocation of resources.
  Themes:
  General Health
    How would you rate your overall health? (single response; Excellent, Good, Average, Below Average, Poor)
    In a typical week, how many different vitamins/supplements, if any, do you take? (single response)
    In a typical year, how many times, if at all, do you go to the dentist?(single response)
    On average, how often do you use sunscreen to protect your skin?(single response)
    Do you currently smoke? Did you ever smoke in the past? How long ago did you quit smoking? (single response)
    How frequently, if at all, do you exercise? (single response)
    How would you describe your current weight? (single response; Extremely overweight, Somewhat overweight, Average weight, Somewhat underweight, Extremely underweight)
  Healthcare Delivery
    What type of healthcare provider do you consider to be your primary healthcare provider? (single response)
    How long have you been seeing this provider? (single response)
    On average, how many times a year, if at all, do you personally see your primary healthcare provider? (single response)
    About how old is your primary healthcare provider? (single response)
    In what location do you usually see your primary healthcare provider?(single response)
    Has a doctor ever asked to screen/test you for _condition_? (single response)
  Compliance
    Level of agreement: I often forget to refill my medicine when I am supposed to
    Level of agreement: I often forget to take my medicine when I am supposed to Category: Media
Purpose of Category: Design marketing mix, i.e., Internet, mail, phone, etc.
  About how many hours a week, if any, do you spend watching TV/using the Internet/reading magazines/etc. (single response)
  Do you currently own: DVR/TiVo, iPod, etc.?
  Do you ever use the Internet to search for health information? How much time do you spend per week?
  Which three sources of healthcare information would you find most useful?(multiple response)

Category: Product/Service Profile
Purpose of Category: Predict participation rates/uptake potential.
Step 1: Present brief description of product/service.
Step 2: Ask respondent to evaluate the product/service described.
  How interested, if at all, are you in learning more about _product/service_?(scaled response)
  How likely, if at all, would you be to ask a doctor/your insurance company/your employer about _product/service_? (scaled response)
  Which one of the following actions are you likely to take with regard to asking your _____ about _product/service_? (single response; discuss during next scheduled visit/call, make a special visit/call within the next 30 days to discuss, make a special visit/call within the next 2-3 months to discuss)
  How likely would you be to tell friends/family about _product/service_?(scaled response)
Category: Demographics
Purpose of Category: Design marketing mix, i.e., Internet, mail, phone, etc.; Customize look and feel of materials.
  Medical History
    Have you ever been diagnosed by a doctor for any of the following?(multiple response)
  General
    Age
    Marital status
    Born in US? If no, how many years living in US?
    Primary language spoken in home?
Category: Secondary Data (any data from sources other than the questionnaire, for example, claims data, pharmacy data, etc.).
Purpose of Category: Classification of disease/medical condition.

Applying an effective combination of categories and themes preferably yields typing tools which provide simple means to accurately identify, project, or verify segment affiliation. Responses to the typing tools may then guide future research and marketing efforts, as well as population group targeting, contact, and/or intervention efforts. An effective combination of categories and themes provide such actionable determinations as, for example:
  Universal Truths
    Know where everyone (actually, 70-80%, the majority) agrees.
    Know what works for everyone.
    Know what has mass appeal/utility.
  Prioritization of Segments
    Which segments represent the greatest opportunity ("low-hanging fruit").
    Which segments are of secondary/tertiary priority.
    Which segments should be avoided b/c of low cost-benefit ratio.
    Which segments are vulnerable to competitors, deterioration.
  Segment Profiles
    Size of segment in marketplace
    Demographic Profile
    Key Drivers of participation/product uptake
    Psychographic Summary
    Behavioral Summary
    Insights, Strengths, Weaknesses, Opportunities & Threats (SWOT)
    Marketing plan outline
    Communications/Reach Recommendations
      Media type
      Believability threshold
      Tone The categories and themes selected for use in an exemplary embodiment of the present invention are selected in view of the overall segmentation objectives. Again, the categories and themes identified above are but examples of the numerous other categories and/or themes which may be adopted, based upon the specific requirements and objectives of the intended application.

The flow proceeds from block 1100 to blocks 1110-1130 which implement a latent class methodology to formulate an optimal segmentation solution. Preferably, the inputs for this analytical stage include wedge variables, sources of data, and results of the statistical techniques available from preceding processes. At block 1110, one or more latent class methodology approaches, such as those illustrated in FIG. 9, are invoked to obtain segmentation solution candidates. Preferably, regression, dimension, and/or cluster-based analytical algorithms known in the art are adapted and suitably implemented to obtain a segmentation solution candidate identifying, among other things, a certain combination of wedge variables.

The latent class analysis is carried out at block 1120 to iteratively develop a set of segmentation solution candidates. Suitable measures are taken during this process to loop the analysis through the comprehensive set of all possible variations of the wedge variables with the different latent class analysis approaches and their parametric configurations. The process at block 1120 thus yields a collection of possible segmentation solutions collectively derived by the various latent class analytical approaches.

At block 1130, the optimal segmentation solution is selected by processing this collection of segmentation solutions preferably using certain predefined statistical tuning parameters and selection criteria. The statistical tuning parameters are set in accordance with standard practice using existing statistical software that performs latent class modeling based upon cluster analysis and/or factor analysis techniques. Multiple iterations of the modeling are performed to generate a variety of segmentation solutions based upon subsets of wedge variables, varying numbers of output segments, including and/or excluding variables with collapsed scales, etc.

At this point, the candidate segmentation solutions found to be of higher priority are manually searched in light of selection criteria predefined for the given application. These selection criteria are generally qualitative in nature requiring an advisory user of sufficient skill and knowledge to bring his/her best judgment to bear on the segmentation solution candidates. Examples of selection criteria include:
  1. Relevant: Are the Key Drivers represented? Are primary research objectives being met? Are there segments that represent meaningful opportunity?
  2. Actionable: Do the segments have clear distinctions? Does the model indicate segments that have a description clear enough to act on relevant segments?
  3. Effective: Are the segments relatively equal in size, such that no single segment is so small as to be irrelevant, and no segment is so large that inhomogeneities may be expected?
  4. Valid: Is the model statistically valid? Was the source data good? Are the degree of relevance, actionability, and effectiveness logically presentable?
  5. Manageable: Are there sufficient numbers of segments and questions to meet other conditions? Has the maximum number of non-contributors been eliminated without sacrificing quality? Depending on the selection criteria actually applied for a given application, each segment of the optimal segmentation solution is defined by one or more wedge variables. Based largely upon the classification of wedge variables made at block 1100, the individual segments of the optimal segmentation solution are appropriately characterized and labeled, preferably within a hierarchal tree such as illustrated in FIGS. 2-3. A tool is thereby obtained for reliably mapping an individual respondent to different profiling branches at different nodes of the hierarchal tree based upon his/her responses or other data corresponding to the segment solutions' set of wedge variables.

While the full set of wedge variables factor into the selection of an optimal segmentation solution, the same full set of wedge variables may not be necessary in its entirety to adequately profile a newly-considered individual using the segmentation solution, namely, its hierarchal tree. Indeed, only a subset of the identified wedge variables will typically be required to profile an individual if the processes of blocks 1010-1130 have been carried out properly.

At block 1140, a typing tool preferably containing a minor subset of the original survey questions, chosen from among the wedge variables, is generated toward this end. Although the questions may be refined versions of original questions contained in the initial survey, they are closely consistent in substance with the original versions. This preserves correlation with the preceding process by which the given segmentation solution was developed. In addition, screening criteria should remain the same when the typing tool is used, so that the population under study is consistent with the population from the initial survey.

Figure 10:
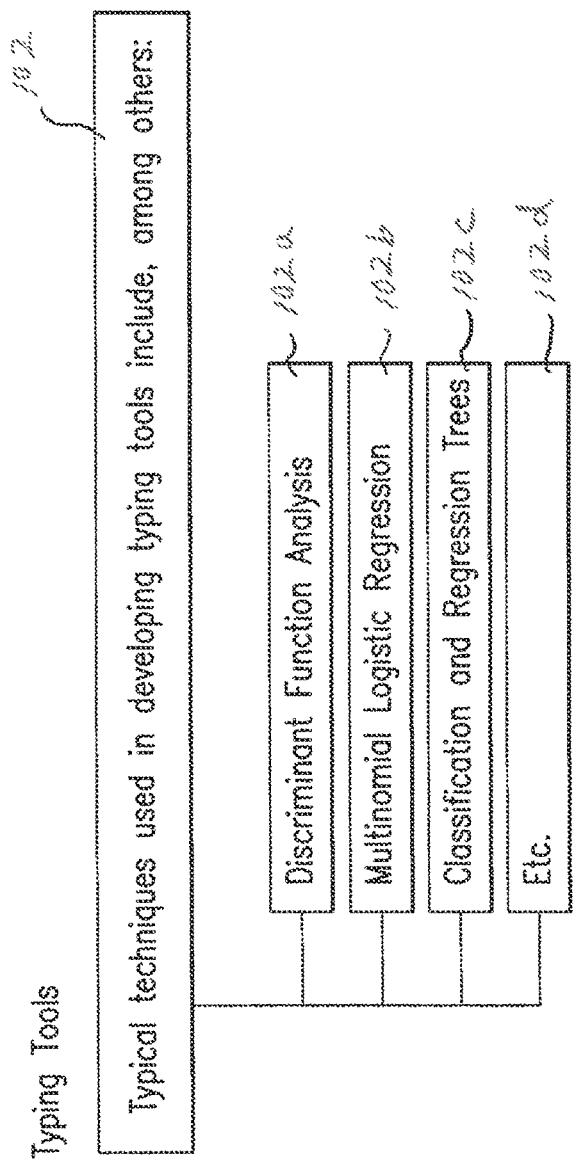
FIG. 10 is a chart illustrating examples of techniques in developing typing tools in accordance with one exemplary embodiment of the present invention.

In block 1140, the optimal segmentation solution is received as the input, and those wedge variables found to be Key Drivers to the segments of that solution are identified. As illustrated in FIG. 10 and described in preceding paragraphs corresponding thereto, techniques 102 such as discriminant function analysis 102a, multinomial logistic regression 102b, and classification/regression trees 102c and others 102d are implemented to develop the typing tool, a shortened survey of the most determinative questions. The system is equipped with a mathematical formula or other suitable measures by which to process responses to questions of this shortened survey and properly map a respondent to the appropriate profile using the segmentation solution.

At block 1150, the wedge variables, optimal segmentation solution, typing tool, and their attendant parameters are stored into the system's data warehouse collectively as an 'applied model' which may be fully accessed as such. More than one such applied model may be generated to psychographically profile individuals based on different factors (and segmentation objectives), for the same or different targeted population, using the processes illustrated by blocks 1000-1150.

Figure 15:
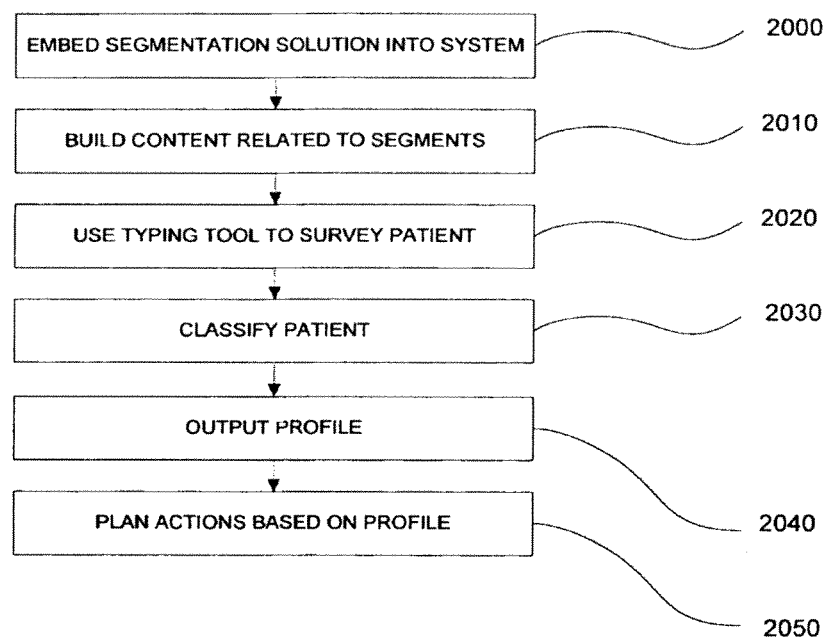
FIG. 15 is a flow diagram schematically illustrating an exemplary flow of processes for making use of an applied model developed in accordance with the embodiment of FIG. 14.

Turning to FIG. 15, there is shown an exemplary flow of processes implemented and/or controlled in software stored in a computer readable medium for making use of an applied model developed in accordance with the processes illustrated in FIG. 14. At block 2000, the optimum segmentation solution for the applied model is preferably embedded in database reference tables. At block 2010, the database is integrated into the system, in part by building application-specific content relating to the segments of the embedded segmentation solution, whereby psychographic profiling use may be made in accordance with the segments.

At block 2020, the typing tool developed for the given applied model, such as an abbreviated patient survey, is used to acquire profiling information from a newly-responding individual. Based on the responses to the typing tool questions, the responding individual is psychographically profiled at block 2030. The profile is appropriately directed at block 2040 such that therapeutic, diagnostic, advisory, or other planned actions ideally suited for the profile is duly prescribed specifically for the individual at block 2050. The planned action(s) may be generated automatically based upon a library of prescriptive actions, or manually generated upon considered review by a skilled care giver or other professional attendant.

Figure 16:
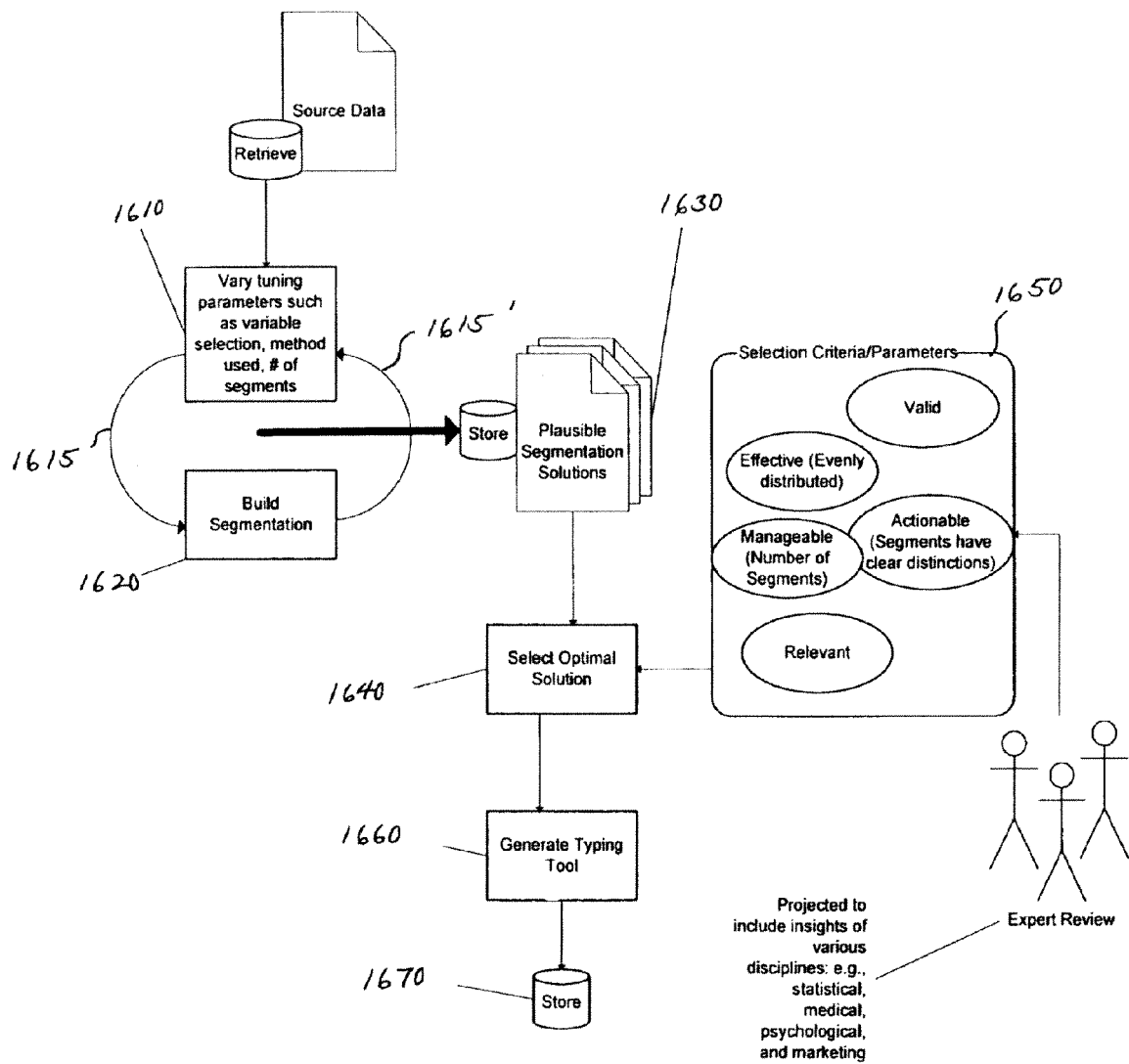
FIG. 16 is a diagram schematically illustrating the flow of data and relative operational configurations of certain processes illustrated in the embodiment of FIG. 14.

Referring to FIG. 16, there is shown a diagram schematically illustrating the flow of data and relative operational configurations of certain processes illustrated in the example of FIG. 14. At block 1610, variables and their tuning parameters obtained and updated in the variable selection and classification processes 1060-1100 of FIG. 14 are passed to block 1620 (as indicated by the forward arrow 1615) in order to build a segmentation candidate using the latent class analysis process 1110. A pool of segmentation candidates is thus developed in this exemplary embodiment preferably by carrying out the variable selection and classification and subsequent latent class analysis-based segmentation building processes in each iteration, is indicated by the reverse arrow 1615'. The segmentation candidates built through this process are stored at block 1630 as a plurality of plausible segmentation solutions from which the optimal solution is selected at block 1640 according to process 1130 of FIG. 14.

As illustrated, the selection process at block 1640 is preferably informed by expert review of the plausible segmentation solutions in light of predetermined selection criteria/parameters illustrated at block 1650. The expert review may be provided at block 1640 live by direct advisory user entry, or by reading in pre-stored advisory review data. It is conceivable that in certain alternate embodiments, artificial intelligence or other such techniques may be employed to suitably infuse the expert advisory insights of various professional disciplines such as statistics, medicine, psychology, marketing, and the like.

A typing tool is generated at block 1660. This is accordingly stored in the system at block 1670 consistent with processes 1140, 1150.

Figure 17:
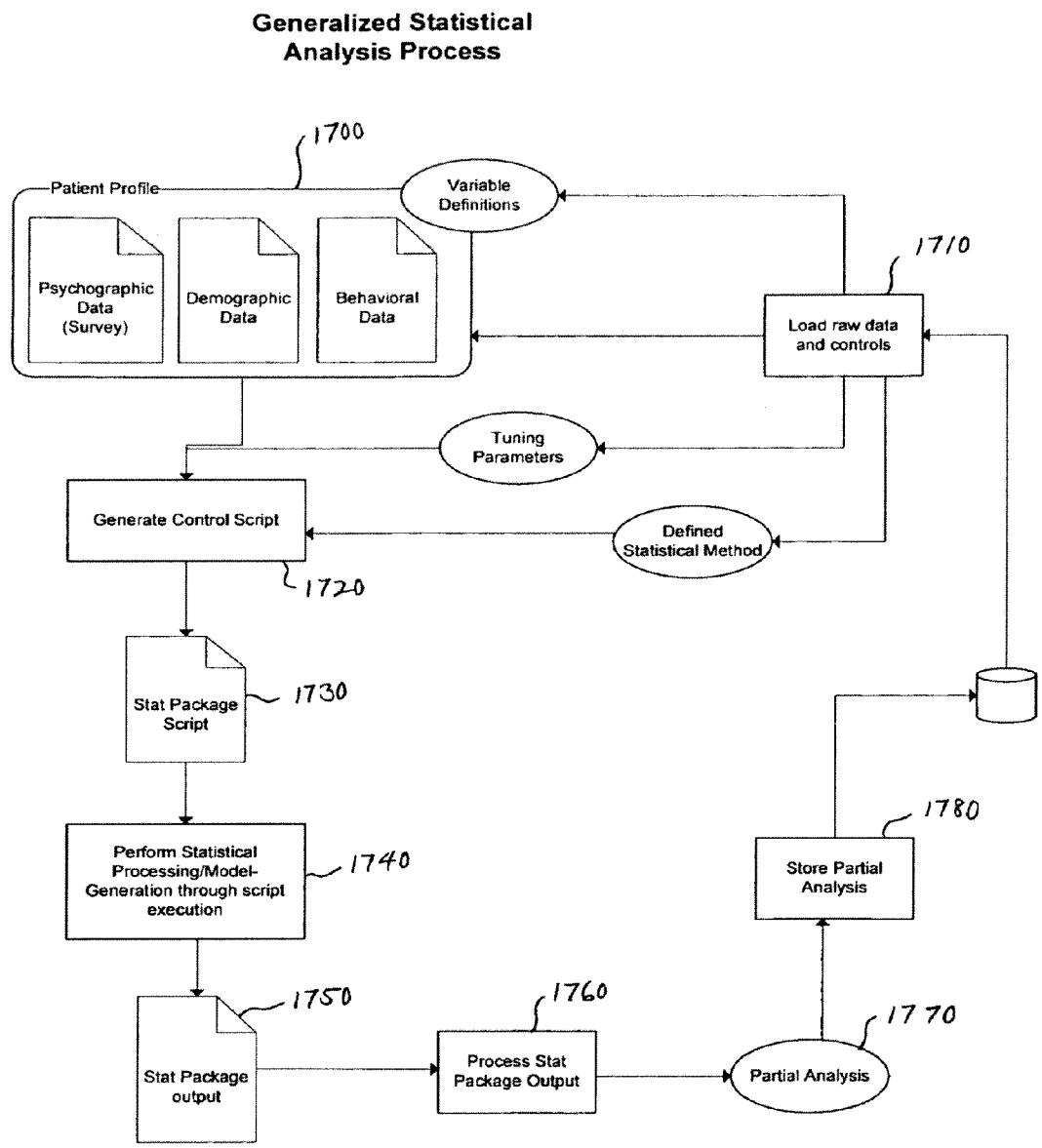
FIG. 17 is a diagram schematically illustrating a generalized software architecture for executing statistical analyses involved in the selection of variables and generation of candidate segmentation solutions illustrated in the embodiment of FIG. 14.

FIG. 17 schematically illustrates a generalized software architecture for executing the statistical analyses involved in the selection of variables and generation of candidate segmentation solutions illustrated in processes 1060-1080 and 1110 of FIG. 14, in accordance with an exemplary embodiment of the present invention. As there shown, the full set of variable definitions for profiling a patient in a health care context is obtained at block 1700 based upon raw data from primary and secondary sources provided at block 1710. Tuning parameters for prioritizing segmentation (such as weighting factors, for example) and the particular statistical method or technique to be utilized—also provided by block 1710—are operably combined at block 1720 with the variable definitions from block 1700 to generate one or more control scripts. Each control script preferably includes one or more programs or sequences of instructions for later interpretation and execution by one or more other system programs.

At block 1730, one or more statistical package scripts, each similarly including one or more programs or sequences of instructions later executable by another program, are generated responsive to the control script generation at block 1720. The statistical processing required during applied model generation is thereafter carried out through execution of such statistical package scripts at block 1740, after which the output of script execution at block 1750 is passed for appropriate processing and required analysis at blocks 1760, 1770. The results of this analysis, representing a partial analysis of all of the data/parameters to be statistically analyzed, are stored at block 1780 for further iterative access by block 1710.

As described in preceding paragraphs, the system established in accordance with a preferred embodiment of the present invention preferably employs a plurality of well-tailored set of graphic user interfaces at each user level depicted, for example, in FIG. 13 to enable convenient interactive user access to various parts of the system. FIGS. 20A-20J illustrate examples of interactive user display windows which may be generated to suit a particular application. The illustrated examples support psychographic profiling as applied to a health care management application.

Figure 18:
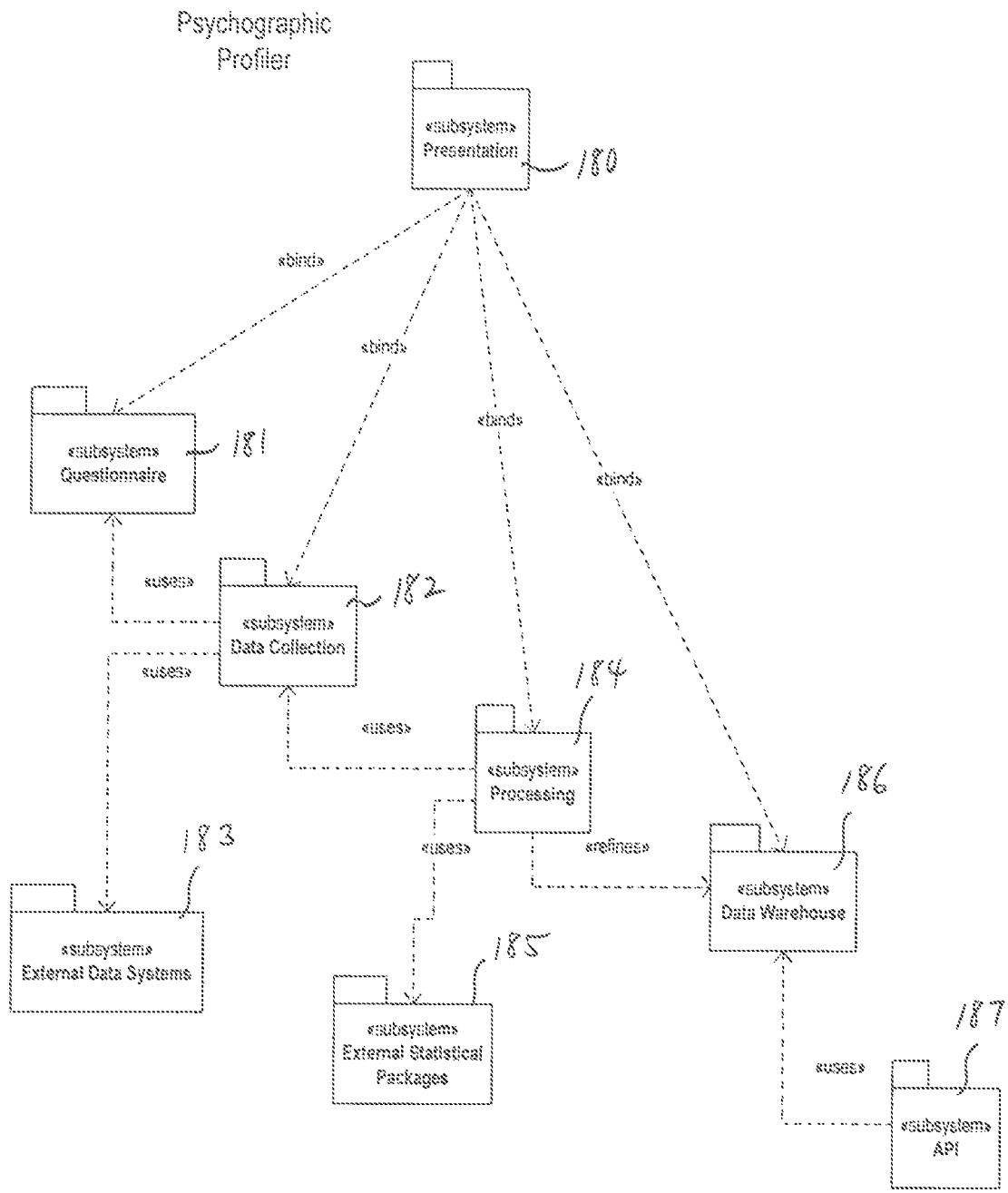
FIG. 18 is a diagram schematically illustrating a functional arrangement of software components for a portion of the exemplary embodiment of FIG. 13.
Figure 19:
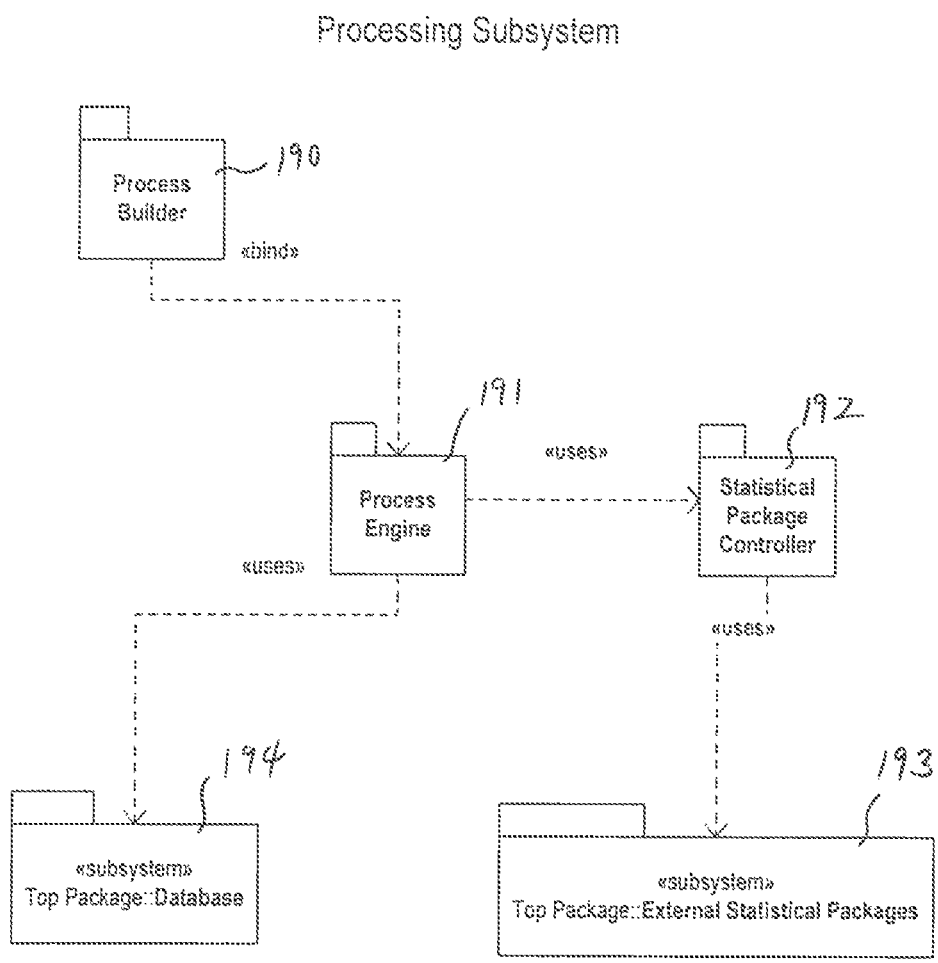
FIG. 19 is a diagram schematically illustrating a functional arrangement of software components for a portion of the exemplary embodiment of FIG. 13; and, FIGS. 20A-K are graphic representations illustrating examples of various interactive user display windows which may be generated to suit a particular application in an exemplary embodiment of the present invention.

FIGS. 18 and 19 together represent an exemplary embodiment of system architecture using Universal Modeling Language (UML) package diagrams. They include logical representations of a possible configuration of software components for the system, in contrast with the physical representation of FIG. 13. UML, package diagrams, logical architecture, and physical architecture are terms of art in the development of software, and therefore not described in separate detail.

The Presentation subsystem 180, or presentation layer, is the area of the system devoted to the interaction between the user and the underlying processing and data subsystems. It generally comprises those components which display information to users and request control parameters from the users.

The Questionnaire subsystem 181 is the area of the system devoted to generation and management of variables (reference blocks 1010-1020). For example, the questions that make up a questionnaire are bound by the presentation layer, as represented by the "binds" connection arrow.

The Data Collection subsystem 182 is an area of the system devoted to the management and assemblage of data from a number of sources (Reference blocks 1030-1040). The subsystem uses the variable/questionnaire schemas defined by the Questionnaire subsystem 181 to determine what data should be collected. It is bound by data provided from the Presentation layer 180 to obtain primary data, and uses external data systems for storage and additional (secondary) input sources.

The External Data Systems subsystem 183 is an umbrella of data sources and systems that allow for long term storage and retrieval. A common example is a database. The subsystem is labeled "external" because pre-existing data storage software is preferably integrated, rather than having data storage and management systems specifically developed. This is but one of many such industry standard systems which may be employed.

The Processing subsystem 184 is devoted to much of the processing described above (Reference blocks 1050-1140). The subsystem uses the Data Collection subsystem 184 to access data for its processing, and uses the External Statistical Packages subsystem 185 to perform statistical modeling. The subsystem outputs the segmentation model which refines the Data Warehouse 186 of all models.

The External Statistical Packages subsystem 185 is devoted to statistical processing of data. This subsystem is also labeled "external" because pre-existing statistical packages are integrated, rather than having statistical modeling components specifically developed.

The Data Warehouse subsystem 186 is devoted to the long term storage and applicability of output segmentation models. The API subsystem 187 is devoted to allowing the use of the models in the data warehouse from other applications.

FIG. 19 is a detailed illustration of the Processing subsystem. A process builder 190 is a component which allows a system user to build a specific automated variable selection process. It binds the parameters to a process engine 191. The process engine 191 is a component which does the work of variable selection in an automated manner. The Statistical Package Controller 192 is a component which generates control scripts and automates external statistical packages 193. The internal interactions of the process engine 191 and statistical package controller 192 are described more fully in FIG. 17. The "Top Package:" subsystems 194 represent tie-ins with the subsystems that are shown in FIG. 18.

Figure 20A:
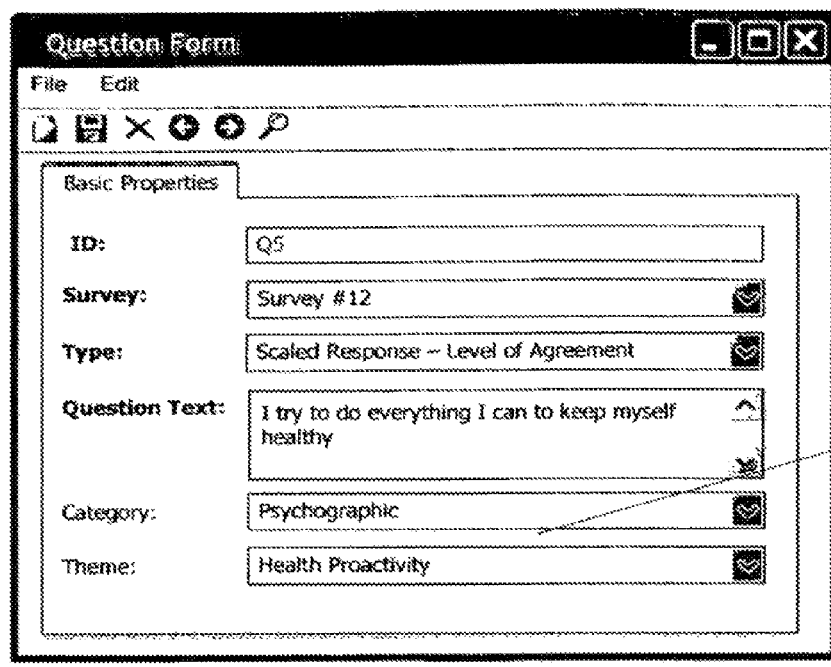

FIG. 20A illustrates an interactive window which may be displayed for the user during the process of defining a comprehensive survey at the data definition stage. The "Question Form" window shown for one particular question of the survey is used by a survey designer or other skilled user contributing in an advisory capacity to the survey definition process in entering the survey question. The window is used to also enter other basic properties pertaining to the question, such as an identifying designation, identity of the particular survey to which the question belongs, the question's type, and its category and theme. These are but examples of the properties which may be entered and displayed in this Question Form, and various other combinations of informational entries may be made in alternate embodiments. Obviously, such informational entries may also be arranged and displayed with visual attributes other than those specifically shown.

Figure 20B:
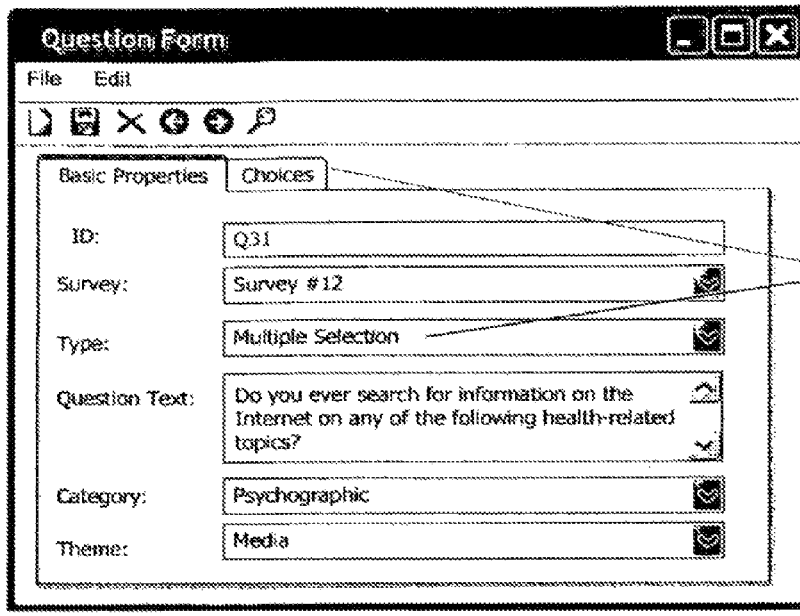
Figure 20C:
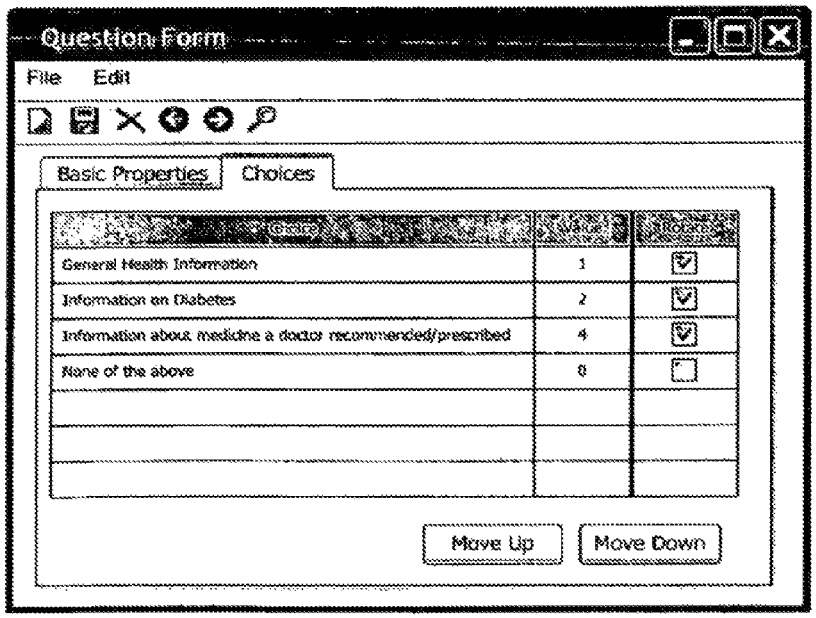

FIGS. 20B-20C illustrate a similar "Question Form" window, but for a different type of question—in this case a multiple selection type of question rather than the skilled response type of question illustrated in FIG. 20A. The Respondent's pre-set response choices are displayed for clarity in this example on a different layer of the window accessed by a user-selectable "Choices" tab shown in the example alongside the "Basic Properties" layer tab. Having selected and opened this window layer, the user may define and set the appropriate attributes for the response choices to be provided.

Figure 20D:
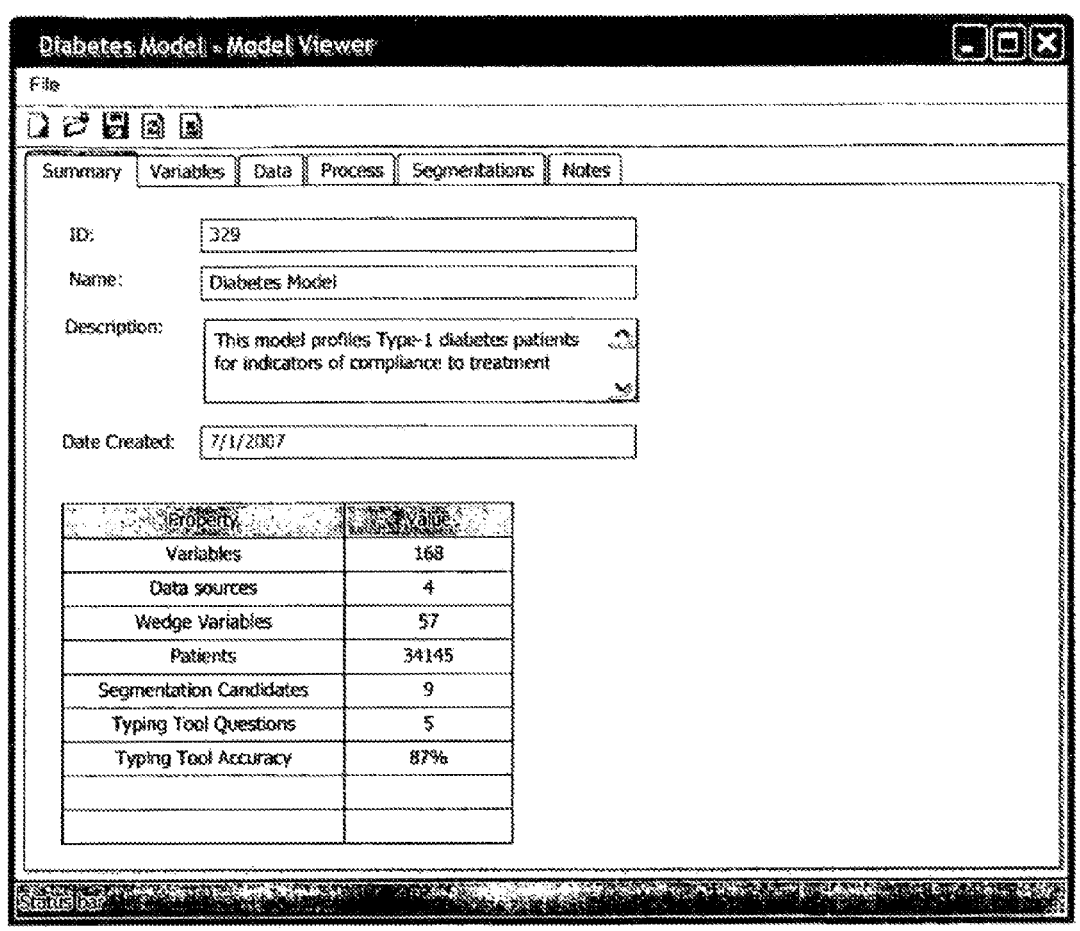

FIG. 20D illustrates an example of a user interactive window preferably available at the advisory user work stations 550 (of FIG. 13) for viewing and setting information relating to a psychographic profiling model under development. In this particular example, the model is designated a "Diabetes Model" for psychographically profiling certain types of diabetic patients for indications of their tendencies to comply with treatment. The summary window layer shown opened provides a status of the relevant parameter settings including, for example, the number of actual variables (many or all of which may be survey questions), the number of computed wedge variables, the size of the sampled patient (or respondent) group, as well as the number of segmentation candidates. The summary also includes such other parametric data as the number of questions in the typing tool resulting from the selected segmentation solution and the expected typing tool accuracy. More detailed information pertaining to the various summarized parameters are provided in this example at various display layers accessible through respective user-selectable tabs labeled "Variables," "Data," "Processor," "Segmentations," "Notes."

Figure 20E:
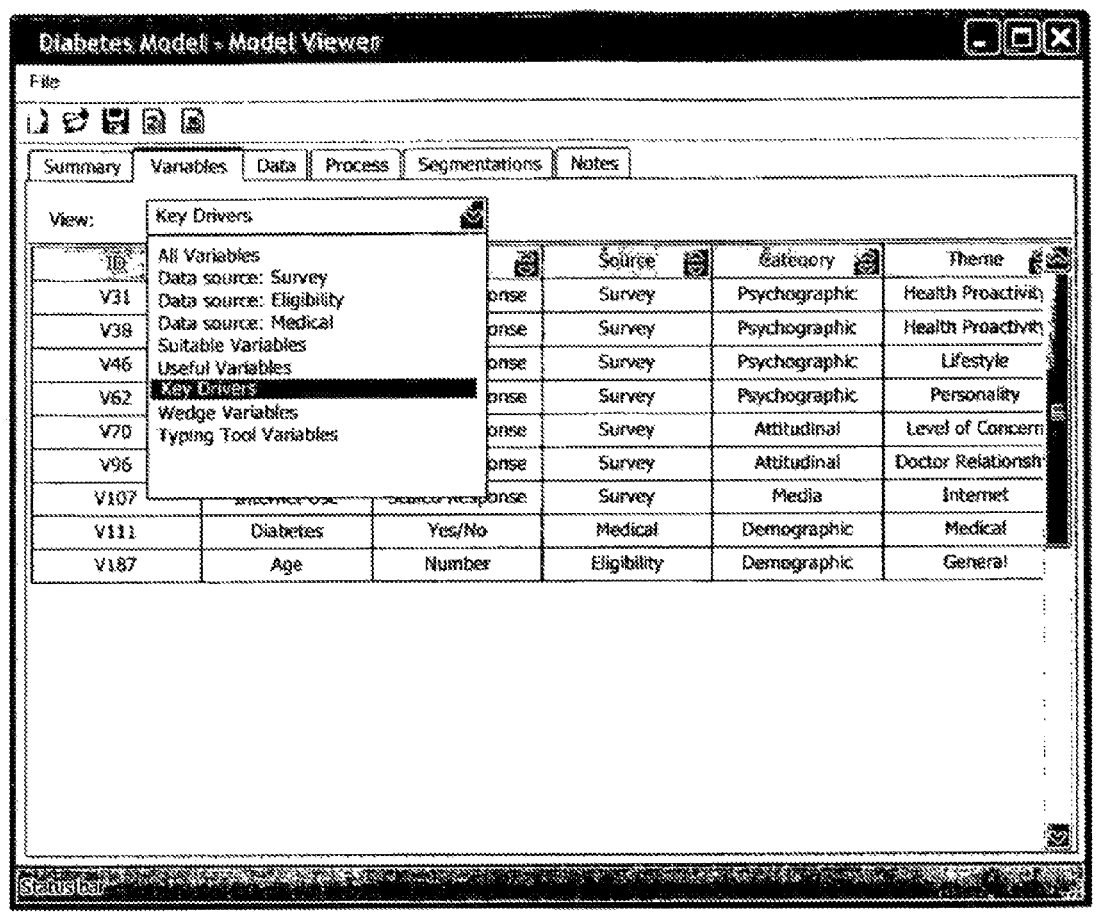
Figure 20F:
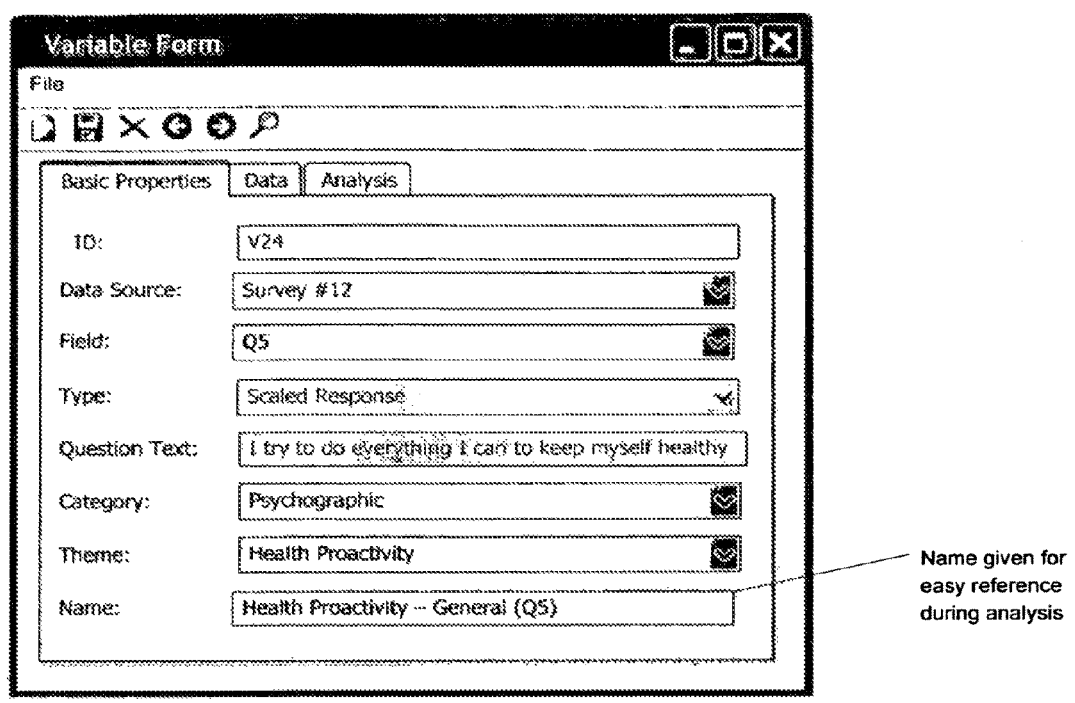

FIG. 20E illustrates the interactive window displayed, for instance, when the "Variables" tab is selected by the user. In the example shown, the sub-window opened by this selection may display one of a plurality of spreadsheets each containing a different tabulation of specific variables and their corresponding information (designation, description, type, source, category, and theme). Preferably, the user may select all or just a subset of variables to view in this manner. In the illustrated example, only those variables determined to be "Key Drivers" are selected for view, and the appropriate spreadsheet containing information for only those variables is displayed.

Variables which have been entered during the data definition stage (for example, at process 1020 of FIG. 14) are reflected in the window shown in FIG. 20E. Each variable may be defined and entered into the system's database using a separate user-interactive window, such as the "Variable Form" window exemplified in FIG. 20F. Preferably, such window is linked to the model viewer window illustrated in FIG. 20E to be directly accessible from that model viewer window simply by appropriate selection of the variable in question. The "Variable Form" window in the example shown provides fields for entry of the various information pertaining to the variable, including the question text if the variable happens to be a survey question.

Figure 20G:
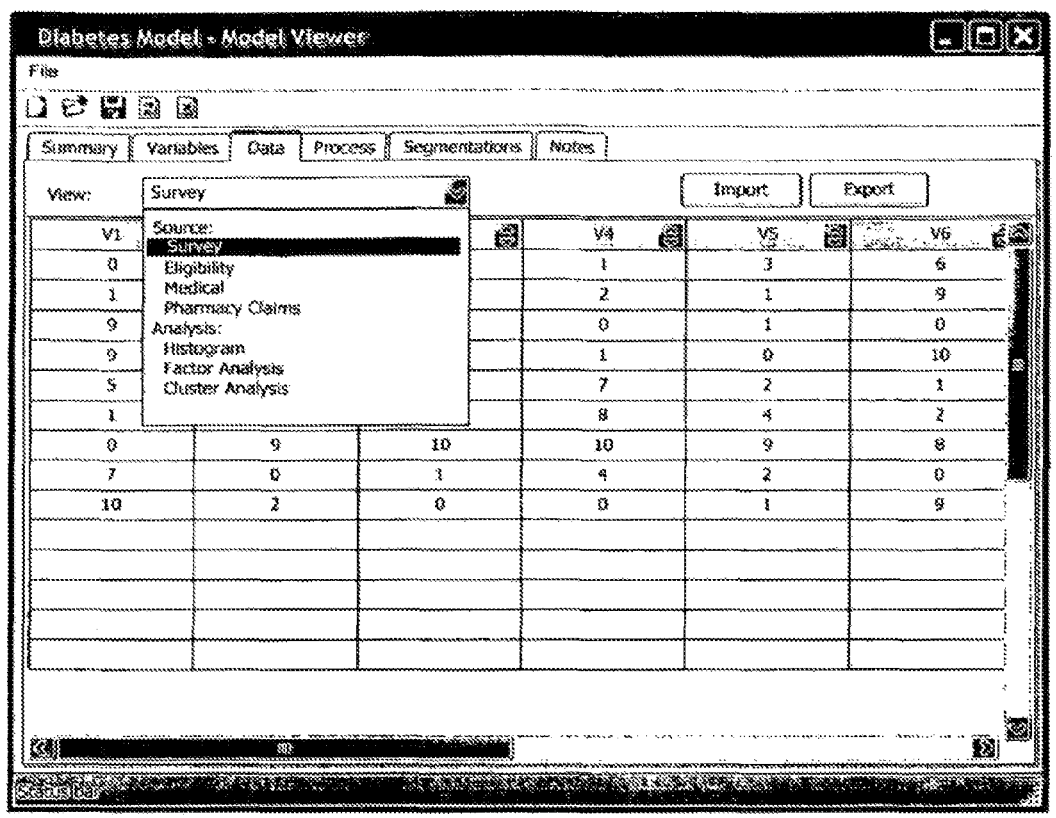

FIG. 20G illustrates an example of a user interactive window opened upon selection of the "Data" layer from the model viewer window of FIG. 20D. Various levels and types of both raw data and processed analytical data may be selectively viewed and accessed for import or export as data from primary and secondary sources are collected and assembled (as indicated at processes 1030, 1040 of FIG. 14). Analytical data such as histogram, factor analysis, and cluster analysis data may likewise be viewed for import or export access.

Figure 20H:
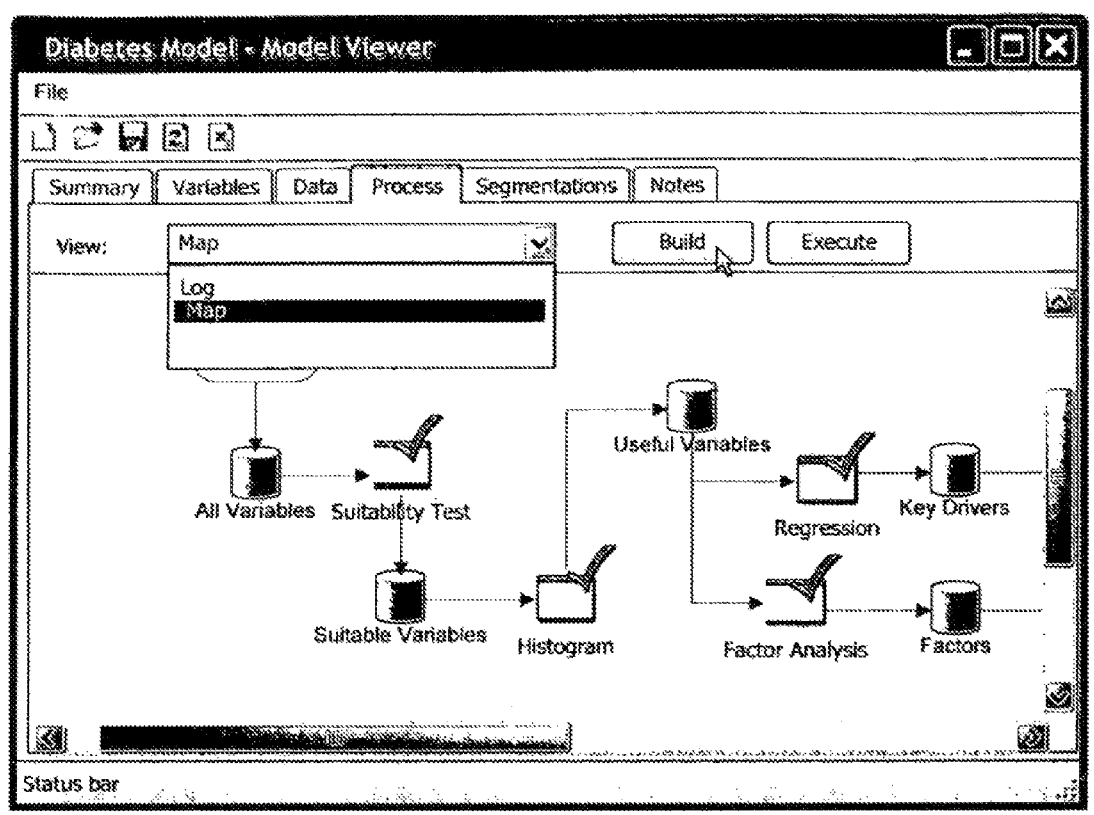
Figure 20:
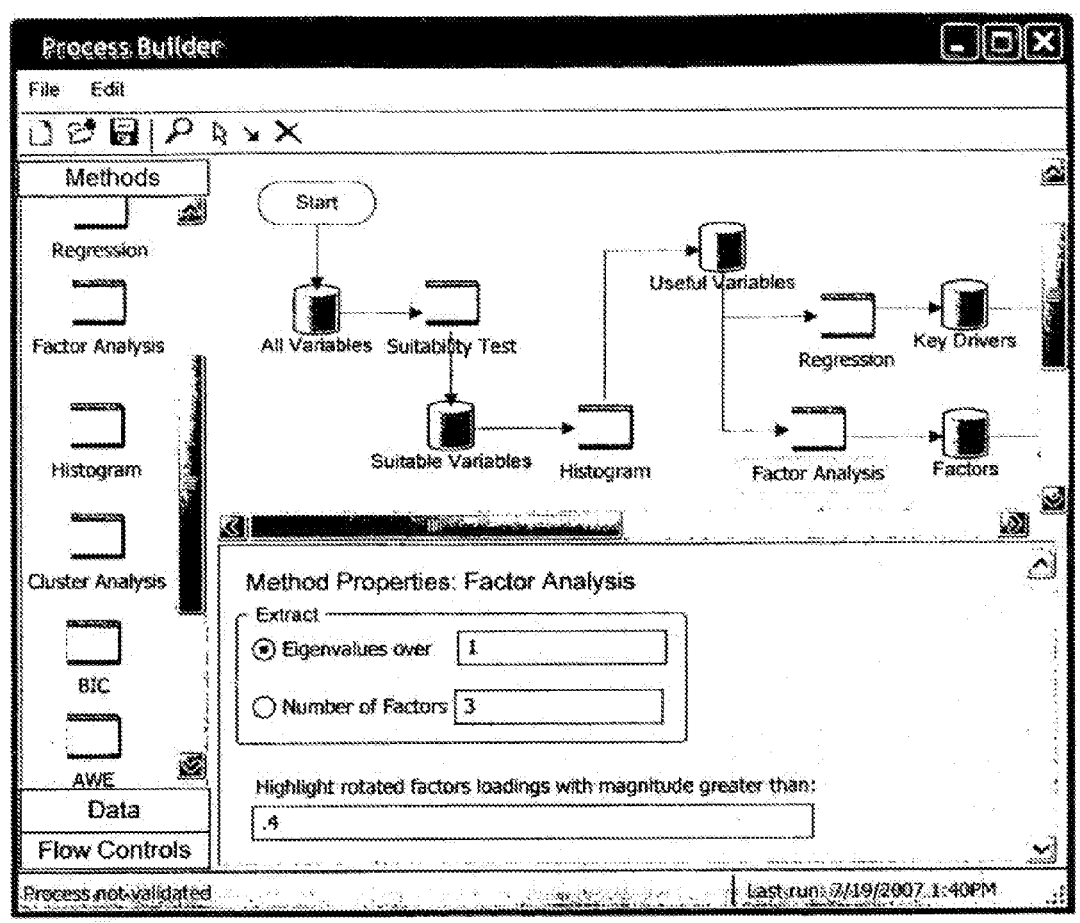

FIG. 20H illustrates an example of another user interactive window displayed at the "Process" layer of the model viewer illustrated in FIG. 20D. At this layer, progression of the psychographic model's development process is visually charted. In the example illustrated, a graphic map is selected for presentation. At the moment captured by the illustrated example, the map visually indicates for the user those variable selection and statistical analysis processes (such as a suitability test, histogram, regression, and factor analysis carried out at blocks 1050-1130 of FIG. 14), along with indicia for the results of each process. Preferably, user selectable controls are provided in this window to initiate user-selectable "Build" and "Execute" options for respectively actuating these processes.

Where the user selects the Process Build option, a corresponding "Process Builder" window is preferably displayed, as shown in the example illustrated by FIG. 20I. This window preferably presents the variable selection and statistical analysis processes for user configuration. The user may select from a menu of such available "Methods" as "Regression," "Factor Analysis," "Histogram," "Cluster Analysis," "BIC," "AWE," and the like. With user selection of the available methods (Factor Analysis selected in the example shown), appropriate fields are presented as necessary for entry/initiation of parametric values (such as an extraction threshold Eigenvalue level). In this manner, the user may custom configure the series of variable selection and statistical analysis processes to be conducted for the given application. To the extent necessary, any necessary parameter settings and selections pertaining to data and process flow controls may be similarly configured to suit. Once the process is "built" to the user's satisfaction, it may be executed by appropriate selection from the preceding window (FIG. 20H).

Figure 20J:
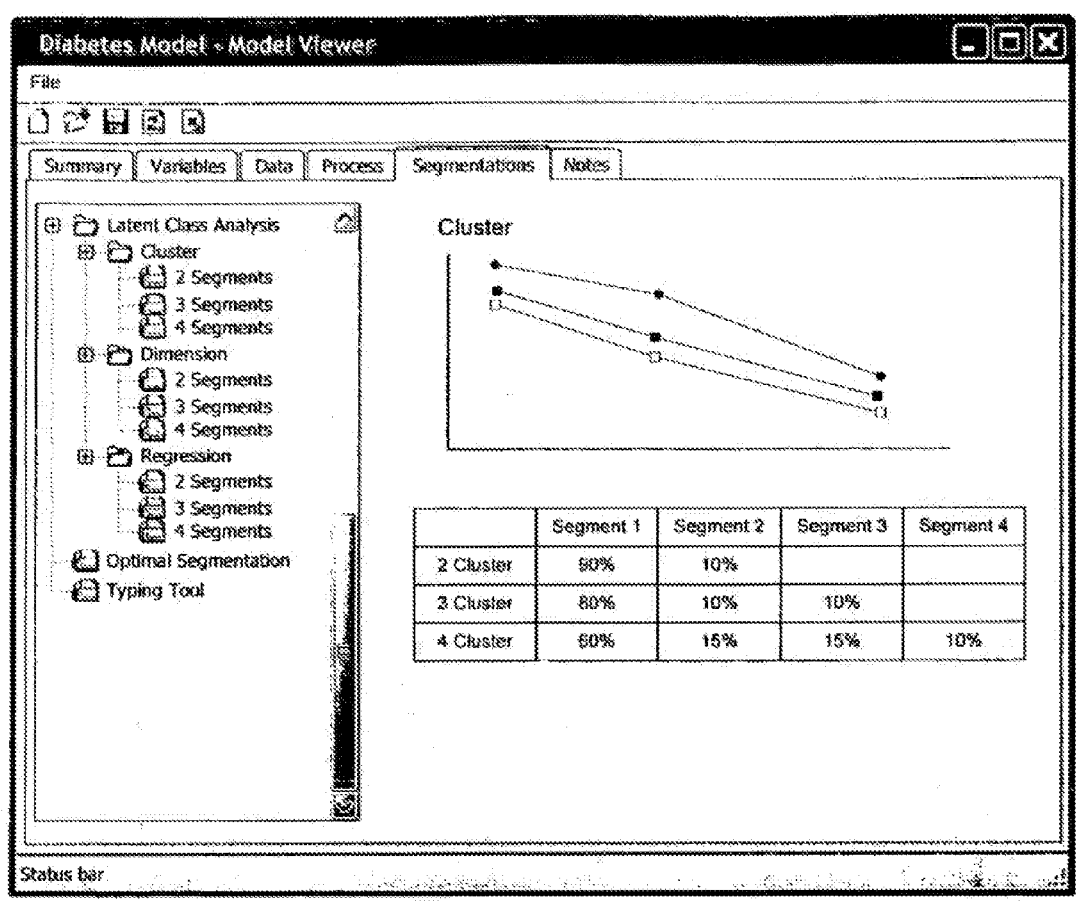

FIG. 20J illustrates an example of a user-selected window opened at another of the tabbed layers of the model viewer window shown in FIG. 20D, namely the "Segmentations" layer. The window in this example displays an outline summary of the number of segments resulting from different runs of latent class analysis methodologies, such as Cluster, Dimension, and Regression. The window preferably also displays for each selected methodology a graphic plot and quantitative tabulation of the statistical results. At the moment captured in the example of FIG. 20J, such graphic and quantitative tabulation displays are shown for the cluster methodology, along with information pertaining to the segmentation solutions' segment sizes. The user may selectively view from this window details of the optimal segmentation solution and typing tool as they are developed.

Figure 20K:
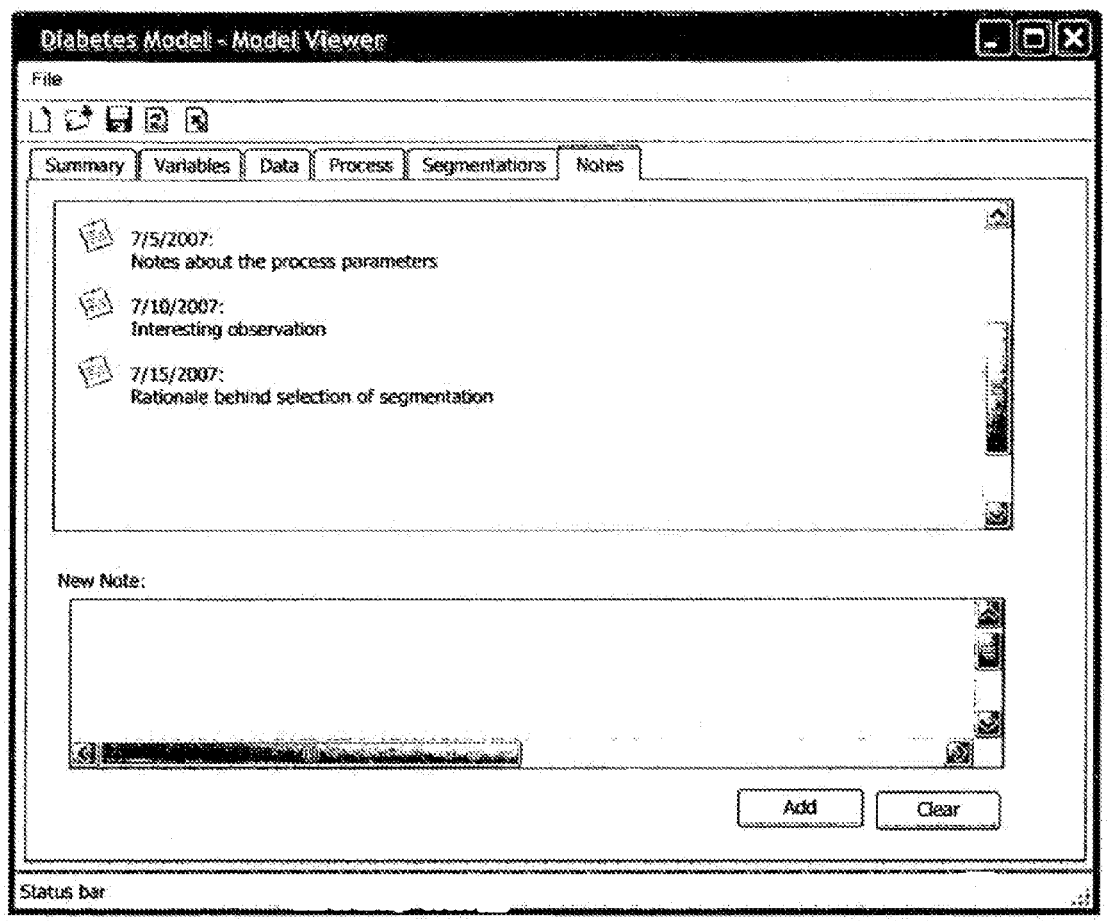

FIG. 20K illustrates an example of yet another user-interactive window displayed at a tabbed layer of the window illustrated in FIG. 20D, namely the "Notes" layer. This layer displays miscellaneous comments entered by users to maintain an ongoing history of the given model's development. The window provides an editing field by which to enter and record new notes.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of flows or processing steps may be reversed or interposed, all without departing from the spirit or scope of the invention as defined in the appended Claims.

What is claimed is:

1. A method for obtaining an indicia indicative of a spread of parameter frequencies within a computer system defining a resultant final indicia of a histogram spread, wherein said computer system includes a computer usable medium having a computer readable code, the method comprising:

establishing a computer processor;

providing a computer program to selectively define psychographic profiles for distinguishing between respondents to a plurality of psychographic queries, the computer program having modules configured for:

compiling a plurality of frequencies of alternative responses to each said psychographic query obtained from members of a population of users to form a histogram of more than two bins representing the alternative psychographic responses, said responses corresponding to characteristic data for respective segments of the population;

applying a plurality of statistical functions to said histogram for determining frequency characteristics of said responses within said histogram;

applying a weighting factor to at least two of said statistical functions for indicating a spread of a histogram for each of said statistical functions to provide a plurality of weighted outputs;

combining said weighted outputs corresponding to each of said statistical functions for determining a final indicia of histogram spread for the responses to each said psychographic query;

selectively generating at least one wedge variable responsive to comparative analysis of said psychographic queries in said final indicia thereof, said wedge variable corresponding to a psychographic query evoking a histogram having a substantially flat or multi-peaked distribution for maximizing a disparity of psychographic responses by the respondents for separating the population of users in corresponding ones of said segments; and, outputting said final indicia of histogram spread to: (1) a computer peripheral device, or (2) to a computer processor program for compiling subsequent responses.

2. The method for obtaining an indicia indicative of a spread of parameter frequencies within a computer system, as recited in claim 1, wherein the step of compiling a plurality of frequencies within a computer system further includes normalizing the histogram to unity.

3. The method for obtaining an indicia indicative of a spread of parameter frequencies within a computer system, as recited in claim 1, wherein the plurality of statistical functions are selected from the group of statistical functions consisting of: standardized entropy, standard deviation, individual maximum odds ratio, neighboring maximum odds ratio, individual index of qualitative variation, and neighboring index of qualitative variation.

4. The method for obtaining an indicia indicative of a spread of parameter frequencies within a computer system, as recited in claim 1, further comprising the step of:
  selectively flagging a question correlating with said histogram as a wedge variable to segment the population of users into homogenous groups responsive to the final indicia of spread.

5. The method for obtaining an indicia indicative of a spread of parameter frequencies within a computer system, as recited in claim 4, further comprising the steps of:
  evaluating metadata associated with said question represented by said histogram; and
  de-selecting said question as a wedge variable if a predetermined number of preselected wedge variables have substantially the same metadata.

6. The method for obtaining an indicia indicative of a spread of parameter frequencies within a computer system, as recited in claim 5, wherein said metadata comprises a thematic category which said question pertains to.

7. The method for obtaining an indicia indicative of a spread of parameter frequencies within a computer system, as recited in claim 6, wherein said thematic category is of a category selected from the group of categories consisting of: demographics, psychographics, behavioral, need-based, media-based, product-based, service-based, and health.

8. The method for obtaining an indicia indicative of a spread of parameter frequencies within a computer system, as recited in claim 1, wherein said computer program is further configured with modules for:
  comparing the final indicia of spread to an expert opinion regarding the spread of the histogram; and
  adjusting a weight factor and a threshold to align the final indicia of spread to the expert opinion.

9. The method for obtaining an indicia indicative of a spread of parameter frequencies within a computer system, as recited in claim 8, wherein said computer program is further configured with modules for:
  iteratively repeating modules on a plurality of questions until the final indicia of spread for each question substantially aligns with the expert opinion regarding the respective question; and
  automatically evaluating the spread of histograms.

10. A system for obtaining an indicia indicative of a spread of parameter frequencies within a computer system defining a resultant final indicia of histogram spread, said computer system including a computer usable medium having a computer readable code, the system comprising:
  a computer processor;
  a computer program to selectively define psychographic profiles for distinguishing between respondents to a plurality of psychographic queries, each said psychographic query having a meta-data attribute electronically stored therefor, the computer program configured to include distinct software modules including:
  a histogram compiling portion, operable to compile a plurality of frequencies of alternative responses to each said psychographic query obtained from members of a targeted population to form a histogram of more than two bins representing the alternative psychographic responses, said responses corresponding to characteristic data for respective segments of the targeted population;
  a frequency determination portion, operable to apply a plurality of statistical functions to said histogram for determining frequency characteristics of said responses within said histogram;
  a weighting portion, operable to apply a weighting factor to at least two of said statistical functions for indicating a spread of a histogram for each of said statistical functions to provide a plurality of weighted outputs;
  a combining portion, operable to combine said weighted outputs corresponding to each of said statistical functions for determining a final indicia of histogram spread for the responses to each said psychographic query, said combining portion selectively generating at least one wedge variable responsive to comparative analysis of said psychographic queries in said final indicia and metadata attribute thereof, said wedge variable corresponding to a psychographic query evoking a histogram having a substantially flat or multi-peaked distribution for maximizing a disparity of psychographic responses by the respondents for separating the targeted population in corresponding ones of said segments; and,
  an outputting portion, operable to output said final indicia of histogram spread to: (1) a computer peripheral device, or (2) to a computer processor program for compiling subsequent responses.

11. The system for obtaining an indicia indicative of a spread of parameter frequencies within a computer system, as recited in claim 10, wherein the histogram compiling portion normalizes said histogram to unity.

12. The system for obtaining an indicia indicative of a spread of parameter frequencies within a computer system, as recited in claim 10, wherein the plurality of statistical functions are selected from the group of statistical functions consisting of: standardized entropy, standard deviation, individual maximum odds ratio, neighboring maximum odds ratio, individual index of qualitative variation, and neighboring index of qualitative variation.

13. The system for obtaining an indicia indicative of a spread of parameter frequencies within a computer system, as recited in claim 10, said computer program further comprising:
  a wedge variable selecting portion, operable to selectively flag a question corresponding to said histogram as a wedge variable to segment the targeted population into homogenous groups responsive to the final indicia of spread.

14. The system for obtaining an indicia indicative of a spread of parameter frequencies within a computer system, as recited in claim 13, said computer program further comprising:
  an evaluating portion, operable to evaluate metadata associated with said question; and
  a de-selecting portion, operable to de-select said question as a wedge variable if a predetermined number of preselected wedge variables have substantially the same metadata.

15. The system for obtaining an indicia indicative of a spread of parameter frequencies within a computer system, as recited in claim 14, wherein said metadata comprises a thematic category which said question pertains to.

16. The system for obtaining an indicia indicative of a spread of parameter frequencies within a computer system, as recited in claim 15, wherein said thematic category is of a category selected from the group of categories consisting of: demographics, psychographics, behavioral, need-based, media-based, product-based, service-based, and health.

17. The system for obtaining an indicia indicative of a spread of parameter frequencies within a computer system, as recited in claim 10, said computer program further comprising:
- a comparison portion, operable to compare the final indicia of spread to an expert opinion regarding the spread of the histogram; and
- an adjusting portion, operable to adjust a weight factor and a threshold to align the final indicia of spread to the expert opinion.

18. The system for obtaining an indicia indicative of a spread of parameter frequencies within a computer system, as recited in claim 17, said computer program further comprising:
- a looping portion, operable to iteratively repeat calls to software modules on a plurality of questions until the final indicia of spread for each question substantially aligns with the expert opinion regarding the respective question; and
- an automated portion, operable to automatically apply modules to automatically evaluate spread of histograms.

19. A non-transitory computer usable medium having a computer readable program code embodied therein for training a system to recognize wedge variables to segment a population of users into homogenous psychographic groups comprising the steps of:
- (A) establishing a computer processor;
- (B) providing a computer program to selectively define psychographic profiles for distinguishing between respondents to a plurality of psychographic questions, the computer program configured for:
  - (1) compiling alternative answers to each said psychographic question from a plurality of users within a targeted population into a histogram of more than two bins representing alternative psychographic answers, the answers corresponding to characteristic data for respective segments of the population;
  - (2) applying a plurality of statistical methods for analyzing the spread of the histogram, each statistical method outputting a value indicating the spread of the histogram;
  - (3) applying a weight factor to said value indicating spread of the histogram output by each statistical method to derive weighted outputs for each statistical method;
  - (4) combining said weighted outputs of each statistical method for deriving a final indicia of histogram spread for the answers to each said psychographic question;
  - (5) selectively generating at least one wedge variable responsive to comparative analysis of said psychographic questions in said final indicia thereof, said wedge variable corresponding to a psychographic question evoking a histogram having a substantially flat or multi-peaked distribution for maximizing a disparity of psychographic answers by the respondents for separating the population of users in corresponding ones of said segments; and,
  - (6) outputting the final indicia of spread of the histogram, whereby the spread is indicative of the segmentation of the population.

20. A system for obtaining an indicia indicative of a spread of parameter frequencies within a computer system defining a resultant final indicia of histogram spread, wherein said computer system including a computer usable medium having a computer readable program code, the system comprising:
- a computer processor executing the computer readable program code to selectively define psychographic profiles for distinguishing between respondents to a plurality of psychographic queries;
- means for compiling a plurality of frequencies of alternative responses to each said psychographic query obtained from members of a targeted population to form a histogram of more than two bins representing alternative psychographic responses, said responses corresponding to characteristic data for respective segments of the targeted population;
- means for applying a plurality of statistical functions to said histogram for determining frequency characteristics of said responses within said histogram;
- means for applying a weighting factor to at least two of said statistical functions for indicating a spread of a histogram for each of said statistical functions to provide a plurality of weighted outputs;
- means for combining said weighted outputs corresponding to each of said statistical functions for determining a final indicia of histogram spread for the responses to each said psychographic query;
- means for selectively generating at least one wedge variable responsive to comparative analysis of said psychographic queries in said final indicia thereof, said wedge variable corresponding to a psychographic query evoking a histogram having a substantially flat or multi-peaked distribution for maximizing a disparity of responses by the respondents for separating the targeted population in corresponding ones of said segments; and
- means for outputting said final indicia of histogram spread to: (1) a computer peripheral device, or (2) to a computer processor program for compiling subsequent responses.

* * * * *